United States Patent
Wessely et al.

(10) Patent No.: US 12,269,916 B2
(45) Date of Patent: Apr. 8, 2025

(54) PRODUCTION OF PU FOAMS

(71) Applicant: Evonik Operations GmbH, Essen (DE)

(72) Inventors: Isabelle Denise Wessely, Karlsruhe (DE); Annegret Terheiden, Alpen (DE); Rüdiger Landers, Essen (DE); Roland Hubel, Essen (DE); Wilfried Knott, Essen (DE); Dagmar Windbiel, Essen (DE); Horst Dudzik, Essen (DE)

(73) Assignee: Evonik Operations GmbH, Essen (DE)

(*) Notice: Subject to any disclaimer, the term of this patent is extended or adjusted under 35 U.S.C. 154(b) by 970 days.

(21) Appl. No.: 17/142,802

(22) Filed: Jan. 6, 2021

(65) Prior Publication Data

US 2021/0253780 A1 Aug. 19, 2021

(30) Foreign Application Priority Data

Feb. 14, 2020 (EP) .................................. 20157313

(51) Int. Cl.
| | | |
|---|---|---|
| C08G 18/76 | (2006.01) | |
| A47C 27/14 | (2006.01) | |
| C08G 18/08 | (2006.01) | |
| C08G 18/18 | (2006.01) | |
| C08G 18/20 | (2006.01) | |
| C08G 18/24 | (2006.01) | |
| C08G 18/48 | (2006.01) | |
| C08G 18/61 | (2006.01) | |
| C08G 77/14 | (2006.01) | |
| C08G 77/46 | (2006.01) | |
| C08J 9/04 | (2006.01) | |
| C08L 83/12 | (2006.01) | |
| C08G 101/00 | (2006.01) | |

(52) U.S. Cl.
CPC .......... *C08G 18/7621* (2013.01); *A47C 27/14* (2013.01); *C08G 18/14* (2013.01); *C08G 18/18* (2013.01); *C08G 18/2063* (2013.01); *C08G 18/244* (2013.01); *C08G 18/48* (2013.01); *C08G 18/4816* (2013.01); *C08G 18/4829* (2013.01); *C08G 18/4837* (2013.01); *C08G 18/61* (2013.01); *C08G 77/46* (2013.01); *C08J 9/04* (2013.01); *C08L 83/12* (2013.01); *C08G 77/14* (2013.01); *C08G 2101/00* (2013.01); *C08G 2110/0008* (2021.01); *C08G 2110/0083* (2021.01)

(58) Field of Classification Search
CPC .... C08G 18/7621; C08G 18/14; C08G 18/18; C08G 18/244; C08G 18/4816; C08G 18/4829; C08G 18/61; C08G 2110/0008; C08G 2110/0083; C08G 18/2063; C08G 18/4837; C08G 77/46; C08G 83/12; C08G 77/14; C08G 18/48; C08G 2101/00; A47C 27/14; C08J 9/04; C08L 83/12

See application file for complete search history.

(56) References Cited

U.S. PATENT DOCUMENTS

| | | |
|---|---|---|
| 3,346,557 A | 10/1967 | Patton, Jr. et al. |
| 3,356,758 A | 12/1967 | Omietanski et al. |
| 3,792,073 A | 2/1974 | Prokai et al. |
| 3,793,237 A | 2/1974 | Watkinson |
| 3,836,560 A | 9/1974 | Prokai et al. |
| 3,900,424 A | 8/1975 | Inoue et al. |
| 3,920,587 A | 11/1975 | Watkinson |
| 3,933,695 A | 1/1976 | Omietanski et al. |
| 3,947,386 A | 3/1976 | Prokai et al. |
| 3,953,383 A | 4/1976 | Inoue et al. |
| 3,957,842 A | 5/1976 | Prokai et al. |
| 4,022,722 A | 5/1977 | Prokai et al. |
| 4,022,941 A | 5/1977 | Prokai et al. |
| 4,042,540 A | 8/1977 | Lammerting et al. |
| 4,147,847 A | 4/1979 | Schweiger |

(Continued)

FOREIGN PATENT DOCUMENTS

| | | |
|---|---|---|
| CA | 2008639 A1 | 8/1990 |
| CA | 3099860 A1 | 11/2019 |

(Continued)

OTHER PUBLICATIONS

Herrmann et al., U.S. Appl. No. 17/448,240, filed Sep. 21, 2021.
European Search Report mailed on Jul. 27, 2020 in EP 20157313.6 (10 pages).
Knott et al., U.S. Appl. No. 17/145,558, filed Jan. 11, 2021.
Knott et al., U.S. Appl. No. 17/297,372, filed May 26, 2021.
Knott et al., U.S. Appl. No. 17/476,417, filed Sep. 15, 2021.
Modro et al., U.S. Appl. No. 17/367,456, filed Jul. 5, 2021.
Glos et al., U.S. Appl. No. 17/414,678, filed Jun. 16, 2021.
Glos et al., U.S. Appl. No. 17/414,726, filed Jun. 16, 2021.
Wagner et al., U.S. Appl. No. 17/391,664, filed Aug. 2, 2021.
Ferenz et al., U.S. Appl. No. 17/523,059, filed Nov. 10, 2021.
U.S. Appl. No. 17/724,560, filed Apr. 20, 2022, 2022/0348721, Knott et al.
Knott et al., U.S. Appl. No. 17/239,011, filed Apr. 23, 2021.

*Primary Examiner* — Rabon A Sergent
(74) *Attorney, Agent, or Firm* — Grüneberg and Myers PLLC

(57) ABSTRACT

Process for producing PU foams by reacting at least one polyol component with at least one isocyanate component in the presence of one or more catalysts that catalyse the isocyanate-polyol and/or isocyanate-water and/or isocyanate trimerization reactions, and optionally one or more chemical or physical blowing agents, with use of SiOC-linked, linear polydialkylsiloxane-polyoxyalkylene block copolymers having repeat (AB) units, obtainable through the reaction of polyether diols with equilibrated α,ω-diacetoxy-polydialkylsiloxanes, wherein a sufficient amount of the SiOC-linked, linear polydialkylsiloxane-polyoxyalkylene block copolymers having repeat (AB) units is added such that the proportion by mass of said component based on the finished PU foam is from 0.0001% to 10% by weight, preferably 0.01% to 6% by weight, especially 0.05% to 5% by weight.

20 Claims, No Drawings

(56) References Cited

U.S. PATENT DOCUMENTS

| | | |
|---|---|---|
| 4,500,704 A | 2/1985 | Kruper, Jr. et al. |
| 4,855,379 A | 8/1989 | Shroot et al. |
| 5,306,737 A | 4/1994 | Burkhart et al. |
| 5,321,051 A | 6/1994 | Burkhart et al. |
| 5,357,018 A | 10/1994 | Burkhart et al. |
| 5,844,010 A | 12/1998 | Burkhart et al. |
| 6,359,022 B1 | 3/2002 | Hickey et al. |
| 6,617,369 B2 | 9/2003 | Parfondry et al. |
| 6,762,274 B2 | 7/2004 | Waddington et al. |
| 6,924,321 B2 | 8/2005 | Casati et al. |
| 7,157,541 B2 | 1/2007 | Knott et al. |
| 7,645,848 B2 | 1/2010 | Knott et al. |
| 7,671,103 B2 | 3/2010 | Eilbracht et al. |
| 7,671,104 B2 | 3/2010 | Heinemann et al. |
| 7,825,205 B2 | 11/2010 | Knott et al. |
| 7,825,209 B2 | 11/2010 | Knott et al. |
| 8,247,467 B2 | 8/2012 | Mijolovic et al. |
| 8,293,808 B2 | 10/2012 | Herrington et al. |
| 10,414,872 B2 | 9/2019 | Knott et al. |
| 10,787,414 B2 | 9/2020 | Boeck et al. |
| 10,793,662 B2 | 10/2020 | Günther et al. |
| 10,836,867 B2 | 11/2020 | Knott |
| 10,954,344 B2 | 3/2021 | Knott et al. |
| 10,995,174 B2 | 5/2021 | Emmrich-Smolczyk et al. |
| 11,066,429 B2 | 7/2021 | Knott et al. |
| 11,905,376 B2 * | 2/2024 | Knott ............... C08G 77/14 |
| 2002/0103091 A1 | 8/2002 | Kodali |
| 2004/0254256 A1 | 12/2004 | Lockwood et al. |
| 2006/0167125 A1 | 7/2006 | Bauer et al. |
| 2006/0229375 A1 | 10/2006 | Hsiao et al. |
| 2006/0293400 A1 | 12/2006 | Wiltz, Jr. et al. |
| 2007/0072951 A1 | 3/2007 | Bender et al. |
| 2007/0238800 A1 | 10/2007 | Neal et al. |
| 2007/0270518 A1 | 11/2007 | Nutzel |
| 2008/0153995 A1 * | 6/2008 | Knott ............... C08G 77/46 |
| | | 525/474 |
| 2008/0171829 A1 | 7/2008 | Haider et al. |
| 2009/0088489 A1 | 4/2009 | Terheiden et al. |
| 2017/0226264 A1 | 8/2017 | Günther et al. |
| 2018/0208707 A1 | 7/2018 | Krebs et al. |
| 2019/0106369 A1 | 4/2019 | Schubert et al. |
| 2020/0055992 A1 | 2/2020 | Knott et al. |
| 2020/0377526 A1 | 7/2020 | Knott et al. |
| 2020/0339612 A1 | 10/2020 | Knott et al. |
| 2020/0377524 A1 | 12/2020 | Knott et al. |
| 2020/0377525 A1 | 12/2020 | Knott et al. |
| 2020/0377660 A1 | 12/2020 | Knott et al. |
| 2020/0377665 A1 | 12/2020 | Knott et al. |
| 2020/0377666 A1 | 12/2020 | Knott et al. |
| 2020/0377684 A1 | 12/2020 | Hermann et al. |
| 2020/0377686 A1 | 12/2020 | Knott et al. |
| 2020/0385528 A1 | 12/2020 | Knott |
| 2021/0015269 A1 | 1/2021 | Terheiden et al. |
| 2021/0047474 A1 | 2/2021 | Klostermann et al. |
| 2021/0130551 A1 | 5/2021 | Knott et al. |
| 2021/0137276 A1 | 5/2021 | Landers et al. |
| 2021/0163687 A1 | 6/2021 | Knott et al. |
| 2021/0171719 A1 | 6/2021 | Knott et al. |
| 2021/0214488 A1 | 7/2021 | Emmrich-Smolczyk et al. |
| 2021/0253799 A1 | 8/2021 | Knott et al. |
| 2021/0301099 A1 | 9/2021 | Knott et al. |
| 2021/0371598 A1 | 12/2021 | Knott et al. |
| 2022/0348721 A1 | 11/2022 | Knott et al. |

FOREIGN PATENT DOCUMENTS

| | | |
|---|---|---|
| CA | 3099861 A1 | 11/2019 |
| CN | 101225172 | 7/2008 |
| CN | 101225173 | 7/2008 |
| DE | 15 45 110 A1 | 6/1969 |
| DE | 22 10 934 A1 | 9/1972 |
| DE | 23 23 398 A1 | 11/1973 |
| DE | 26 40 595 A1 | 2/1974 |
| DE | 2 533 074 A1 | 3/1976 |
| DE | 4 229 402 A1 | 3/1994 |
| DE | 4 239 054 A1 | 5/1994 |
| DE | 10 2004 001 408 A1 | 7/2005 |
| DE | 10 2006 061 351 A1 | 6/2008 |
| EP | 0 380 993 A2 | 8/1990 |
| EP | 0 493 836 A1 | 7/1992 |
| EP | 0 533 202 A1 | 3/1993 |
| EP | 0 780 414 A2 | 6/1997 |
| EP | 0 839 852 A2 | 5/1998 |
| EP | 0 867 465 A1 | 9/1998 |
| EP | 1 161 474 A1 | 12/2001 |
| EP | 1 240 228 A1 | 9/2002 |
| EP | 1 520 870 A1 | 4/2005 |
| EP | 1 537 159 A1 | 6/2005 |
| EP | 1 544 235 A1 | 6/2005 |
| EP | 1 678 232 A2 | 7/2006 |
| EP | 1 712 578 A1 | 10/2006 |
| EP | 1 757 637 A | 2/2007 |
| EP | 1 935 922 A2 | 6/2008 |
| EP | 1 935 923 A2 | 6/2008 |
| EP | 2 042 534 A1 | 4/2009 |
| EP | 2 104 696 B1 | 9/2013 |
| EP | 3 205 680 A1 | 8/2017 |
| EP | 3 611 214 A1 | 2/2020 |
| EP | 3 611 216 A1 | 2/2020 |
| EP | 3 611 217 A1 | 2/2020 |
| WO | 96/12759 A2 | 5/1996 |
| WO | 00/58383 A1 | 10/2000 |
| WO | 01/58976 A1 | 8/2001 |
| WO | 02/22702 A1 | 3/2002 |
| WO | 03/029320 A1 | 4/2003 |
| WO | 2004/020497 A1 | 3/2004 |
| WO | 2004/060956 A1 | 7/2004 |
| WO | 2004/096882 A1 | 11/2004 |
| WO | 2005/033167 A2 | 4/2005 |
| WO | 2005/063841 A1 | 7/2005 |
| WO | 2005/085310 A2 | 9/2005 |
| WO | 2005/118668 A2 | 12/2005 |
| WO | 2006/055396 A1 | 5/2006 |
| WO | 2006/094227 A2 | 9/2006 |
| WO | 2006/116456 A1 | 11/2006 |
| WO | 2007/111828 A2 | 10/2007 |
| WO | 2008/058913 A1 | 5/2008 |
| WO | 2009/058367 A1 | 5/2009 |
| WO | 2009/130470 A1 | 10/2009 |
| WO | 2011/163133 A1 | 12/2011 |
| WO | 2013/022932 A1 | 2/2013 |
| WO | 2013/102053 A1 | 7/2013 |
| WO | 2010/028362 A1 | 3/2020 |

* cited by examiner

PRODUCTION OF PU FOAMS

CROSS REFERENCE TO RELATED APPLICATIONS

This application is a 35 U.S.C. § 119 patent application which claims the benefit of European Application No. 20157313.6 filed Feb. 14, 2020, which is incorporated herein by reference in its entirety.

FIELD

The present invention is in the field of PU foams. It relates in particular to a process for producing PU foams using certain SiOC-linked, linear polydialkylsiloxane-polyoxyalkylene block copolymers having repeat (AB) units.

BACKGROUND

Polyurethane foams (PU foams) are known per se. These are cellular and/or microcellular polyurethane materials. They can be divided into classes including closed-cell or partly closed-cell rigid PU foams and open-cell or partly open-cell flexible PU foams. Rigid PU foams are used predominantly as insulation materials, for example in refrigerator systems or in the thermal insulation of buildings. Flexible PU foams are used in a multitude of technical applications in industry and the domestic sector, for example for sound insulation, for production of mattresses or for cushioning of furniture. A particularly important market for various types of PU foams, such as conventional flexible foams based on ether or ester polyols, cold-cure flexible foams, also referred to hereinafter as cold-cure foams (frequently also as "high-resilience" (HR) foams), viscoelastic flexible foams and rigid foams, and also foams having properties between these two classifications, is e.g. the automobile industry. It is possible here, for example, to use rigid foams as inner roof liner, ester foams as interior door trim and for die-cut sun visors, and cold-cure and flexible foams for seating systems. A further particularly important market relates to mattresses and seating systems in homes, offices and the like. With regard to flexible foams, a distinction can also be made here between cold-cure flexible foams and hot-cure flexible foams, as described e.g. in EP 2042 534 A1, to which reference is made here in full.

A specific class of flexible polyurethane foams is that of viscoelastic foams. These are characterized both by low rebound resilience (preferably <10%, compared with a rebound resilience of 35-45% for conventional flexible PU foams) and by slow, gradual recovery of shape after compression (recovery time preferably 2-10 s). Materials of this kind are well known in the prior art and are highly valued for their energy- and sound-absorbing properties. Viscoelastic foam materials are encountered in a multitude of fields of use for cushioning (for example in cushions, seat covers, mattresses, etc.), as sound- and/or vibration-dampening materials, or else as impact protection. Typical viscoelastic foams have lower porosity and high density compared with standard flexible ether polyurethane foams. Cushions having a density of usually 30-50 kg/m$^3$ are at the lower end of the density scale typical of viscoelastic foams, whereas mattresses often have a density in the range of 50-130 kg/m$^3$.

The majority of conventional polyurethane foams are block copolymers that have spatially separate regions of different phases having high and low glass transition temperatures (TG). The glass transition temperature divides the brittle energy-elastic region (=glass region) below it from the soft entropy-elastic region (=elastomeric region) above it. The DMA ("dynamic mechanical analysis") spectra of such materials typically feature a relatively flat region ("modulus plateau") between the different glass transitions. The region of low glass transition temperature (often also referred to as "soft block") usually derives from a liquid or from an oligomeric resin of low melting temperature, for example polyether polyols and polyester polyols. The phase of high glass transition temperature forms during the polymerization as a result of the associated formation of urethane units.

In conventional polyurethanes, the hard phases (high glass transition temperature) and soft phases (low glass transition temperature) align with one another during the polymerization and then separate spontaneously. Chemical viscoelastic polyurethane foams are in this regard a special case in which the above-described phase separation occurs only incompletely or not at all. The glass transition temperature of viscoelastic foams is preferably between −20 and +15° C., whereas the glass transition temperature of standard flexible polyurethane foams is regularly below −35° C.

As a general rule, viscoelastic polyurethane foams are more difficult to produce on a commercial scale than conventional flexible PU foams. The foaming itself and the curing of the resultant foam are very sensitive to disturbances. Small fluctuations in composition (due for example to fluctuations in catalyst loading) or in process control can swiftly result in reject material. The amount of water in the case of production of viscoelastic PU foams is typically less than 3 pphp (parts per hundred parts polyol), which is less than in conventional flexible PU foams. This fact in combination with the use of specific polyols makes it much more difficult to produce viscoelastic PU foams.

As well as the above-described problems in the production of viscoelastic PU foams, it is common knowledge that the cell opening is a particularly critical step in the production of such foams. Particularly when TDI T80 is used as the isocyanate component, there is frequently severe shrinkage as a result of insufficient cell opening, which in turn makes process control more difficult. In addition, there is a general trend towards higher foam densities. However, higher densities necessitate a lower water content and hence a lower content of chemical blowing agent in the foam formulation. The reduced water content results in a smaller amount of urea being formed, which in turn results in a foam having lower porosity. To compensate for this level of closed cells, cell openers are used in such formulations Various further options are known in the prior art for opening closed cells in flexible polyurethane foams.

For instance, it is possible to open the cells in flexible polyurethane foams by a mechanical route, by flexing the corresponding moldings after demolding. This method is commonplace, but is both time-consuming and energy-intensive and is employable only in the production of moldings.

In addition, the open-cell content of viscoelastic polyurethane foams can be improved by using, as compounds having at least two hydrogen atoms reactive towards isocyanate groups, in the form of mixtures of at least one polyether alcohol having a high content of ethylene oxide, preferably at least 50% by weight, and at least one polyether alcohol that is incompatible with these polyether alcohols and has a high content of propylene oxide, preferably at least 90% by weight, as described, for example, in patent documents US 2004/0254256 and EP 1 240 228. Although the use of ethylene oxide-rich polyether alcohols increases the open-cell content of the foams, the increase in the hydrophilicity of the foams is disadvantageous. As a result, these foams swell by up to 40% by volume on contact with water. This swelling behavior is unacceptable, particularly for applications in damp environments.

Various kinds of additives are still used as cell openers in the prior art. For instance, solid particles are frequently used for the opening of polyurethane foams. For example, $CaCO_3$ is a standard filler in the PU industry. However, the cell-opening properties of calcium carbonate are usually too low for viscoelastic applications.

A standard method for opening the cells of water-blown polyurethane foams is the use of incompatible liquids known as defoamers. These are immiscible with the polyol/isocyanate reaction mixture but can act on the silicone stabilizers in the reaction mixture at the phase interface and thus facilitate cell opening. Typically, dimethylsiloxanes (silicone oils) are used for this purpose. A known problem with the use of silicone oils is that they promote cell opening at a very early stage of foam formation and hence destabilize the foam. A further disadvantage of the use of silicone oils as cell openers is the very narrow processing window and the usually very coarse cell structure of the resultant foams. In addition, it is also possible to use mineral oils as incompatible liquids. Although these are effective cell openers, they lead to an oily surface and hence to an unwanted tactile perception of the foams. However, there are also incompatible liquids that are nonetheless suitable as cell openers. A problem frequently encountered with incompatible liquids used as cell openers is the unpleasant odor and unfavorable emissions profile, as determined for example by the test chamber method based on DIN standard DIN EN ISO 16000-9:2008-04, 24 hours after loading the test chamber.

A further approach is the use of linear block copolymers consisting of polydialkylsiloxane blocks and polyether blocks [(polyether)(polydialkylsiloxane)]n, as described in patent specifications U.S. Pat. No. 3,836,560 and DE 10 2006 061 351 A1. These $A(BA)_n$ structures are able to stabilize the foam in the formation phase by preventing the coalescence of gas bubbles. At the end of the foam-forming reaction, they then facilitate cell opening. Below 30,000 g/mol, the $A(BA)_n$ copolymers have only a minor stabilizing effect, which is why the minimum average molar mass is typically 30,000 g/mol, preferably between 60,000 g/mol and 120,000 g/mol. However, a problem is that these structures have a tendency to form hydrogels in the presence of water, which restricts the field of use thereof to a very high degree. A second problem with such $A(BA)_n$ structures is that control of the molecular weight during production is non-trivial, which makes process control complicated. Moreover, the high molecular weight of such structures means they are usually highly viscous, which can make them difficult to handle for those carrying out foaming. A further problem with this substance class is the high amounts of volatile organic compounds (VOCs) that arise both on account of the raw materials used and as a consequence of process control, resulting in excessively high emissions values and strong odor in the PU foam produced.

The production of PU foams, especially the production of viscoelastic polyurethane foams, remains in need of further improvements in product quality, particularly with regard to the production of low-odor PU foams and/or the production of low-emissions PU foams. The specific problem addressed by the present invention was accordingly that of providing PU foams, especially viscoelastic polyurethane foams, that are low in odor and/or low in emissions as regards emissions of volatile organic compounds (VOCs).

SUMMARY

It was surprisingly found that this problem is solved by a process for producing PU foams using certain SiOC-linked, linear polydialkylsiloxane-polyoxyalkylene block copolymers having repeat (AB) units.

DETAILED DESCRIPTION

Against this background, the present invention provides a process for producing PU foams by reacting
(a) at least one polyol component with
(b) at least one isocyanate component in the presence of
(c) one or more catalysts that catalyse the isocyanate-polyol and/or isocyanate-water and/or isocyanate trimerization reactions, and
(d) optionally one or more chemical or physical blowing agents, with use of
(e) SiOC-linked, linear polydialkylsiloxane-polyoxyalkylene block copolymers having repeat (AB) units, obtainable through the reaction of polyether diols with equilibrated, preferably end-equilibrated, $\alpha,\omega$-diacetoxypolydialkylsiloxanes, wherein a sufficient amount of the SiOC-linked, linear polydialkylsiloxane-polyoxyalkylene block copolymers having repeat (AB) units (e) is added such that the proportion by mass of said component (e) based on the finished PU foam is from 0.0001% to 10% by weight, preferably 0.01% to 6% by weight, especially 0.05% to 5% by weight.

Components (a) to (d) are known per se; they are described in more detail hereinbelow. Component (e) for the purposes of this invention are SiOC-linked, linear polydialkylsiloxane-polyoxyalkylene block copolymers having repeat (AB) units, obtainable through the reaction of polyether diols with equilibrated, preferably end-equilibrated, $\alpha,\omega$-diacetoxypolydialkylsiloxanes.

Employable component (e) and options for the provision thereof are described in detail in the as yet unpublished European patent application under file reference 18189072.4. Component (e) and the provision thereof are also described in detail hereinbelow in the present description. The disclosure of the as yet unpublished European patent application under file reference 18189072.4 is incorporated in full into the present description.

Advantageously, the present invention enables the provision of low-odor and/or low-emissions PU foams, in particular of low-odor and/or low-emissions viscoelastic PU foams, as demonstrated in the examples. What is meant here by "low-odor" is that, as a result of the use of component (e), the PU foam obtained has a lower product odor compared with foams produced in an otherwise comparable manner except that cell-opening and/or stabilizing additives according to the prior art have been used, this being verifiable especially through olfactory testing by a panel of personnel trained in odor assessment. The methods of determination chosen for the purposes of the present invention are elucidated in detail in the Examples section.

"Low-emissions" relates to emissions of volatile organic compounds (VOCs). These are determined by the test chamber (TC) test based on DIN standard DIN EN ISO 16000-9:2008-04, 24 hours after loading the test chamber, as elucidated in detail in the Examples section. What is meant here by "low in emissions" is that, as a result of the use of component (e), the PU foam obtained, especially a viscoelastic PU foam, has lower VOC emissions compared with foams produced in an otherwise comparable manner except that cell-opening and/or stabilizing additives according to the prior art have been used, this being verifiable especially by the test chamber (TC) test according to the invention. A further advantage is that the PU foams concerned, for example hot-cure flexible PU foams, are also able to meet emissions specifications such as CertiPUR. Low in emissions according to CertiPUR means that the total emissions of volatile organic substances (TVOC) is less than 500 µg/m³. Further technical details of the requirements for the CertiPUR standard (version 1, July 2017) can be found at: https://www.europur.orgfimages/CertiPUR_Technical_Paper_-20_Full_Version_-_2017.pdf. This latter document (version 1, July 2017) can also be ordered directly from EUROPUR, Avenue de Cortenbergh 71, B-1000 Brussels, Belgium.

A further advantage is that the PU foams concerned, for example hot-cure flexible PU foams, are particularly low in emissions as regards emissions of low-molecular-weight linear and cyclic siloxanes. What is meant more particularly for the purposes of the present invention by "low in emissions" with regard to low-molecular-weight siloxanes is that the PU foams obtained in accordance with the invention have a siloxane emission of $\geq 0$ µg/m³ to $\leq 500$ µg/m³, preferably $\leq 200$ µg/m³, more preferably $\leq 100$ µg/m³, appropriately determined by the test chamber method based on DIN standard DIN EN ISO 16000-9:2008-04, 24 hours after loading the test chamber. This method is described precisely in EP 3205680A1, specifically in paragraph [0070], which is hereby incorporated by reference.

The subject matter of the invention is described by way of example hereinbelow, without any intention that the invention be restricted to these illustrative embodiments. Where ranges, general formulae or classes of compounds are specified below, these are intended to encompass not only the corresponding ranges or groups of compounds that are explicitly mentioned but also all subranges and subgroups of compounds that can be obtained by taking out individual values (ranges) or compounds. Where documents are cited in the context of the present description, the entire content thereof, particularly with regard to the subject matter that forms the context in which the document has been cited, is intended to form part of the disclosure content of the present invention. Unless otherwise stated, percentages are in percent by weight. Where average values are given hereinbelow, the values concerned are weight averages, unless otherwise stated. Where parameters that have been determined by measurement are given hereinbelow, the measurements have been carried out at a temperature of 25° C. and a pressure of 101 325 Pa, unless otherwise stated.

Polyurethane (PU) in the context of the present invention is especially understood as meaning a product obtainable by reaction of polyisocyanates and polyols or compounds having isocyanate-reactive groups. Further functional groups in addition to the polyurethane may also be formed in the reaction, examples being uretdiones, carbodiimides, isocyanurates, allophanates, biurets, ureas and/or uretonimines. Therefore, PU is understood for the purposes of the present invention as meaning not just polyurethane, but also polyisocyanurate, polyureas, and polyisocyanate reaction products containing uretdione, carbodiimide, allophanate, biuret and uretonimine groups. In the context of the present invention, polyurethane foam (PU foam) is understood as meaning foam that is obtained as reaction product based on polyisocyanates and polyols or compounds having isocyanate-reactive groups. In addition to the eponymous polyurethane, other functional groups may also be formed here, for example allophanates, biurets, ureas, carbodiimides, uretdiones, isocyanurates or uretonimines. Therefore, PU foams are understood for the purposes of the present invention as meaning both PU foams (PUR foams) and polyisocyanurate foams (PIR foams). Preferred PU foams are flexible PU foams, rigid PU foams and integral PU foams. Particular preference here is given to conventional flexible PU foams based on ether or ester polyols, highly elastic cold-cure polyurethane foams (also referred to hereinafter as "high-resilience", i.e. HR PU foams), viscoelastic PU foams, hypersoft PU foams, semirigid PU foams and rigid PU foams, and also PU foams that have intermediate properties between these classifications and are used in the automobile industry. More particularly, all the above-mentioned PU foam types are covered by the invention. However, in the context of this invention, viscoelastic PU foams are most preferred.

It will be apparent that a person skilled in the art seeking to produce the different PU foam types, for example hot-cure, cold-cure or ester-type flexible PU foams or rigid PU foams, will appropriately select the substances necessary for the purpose in each case, for example isocyanates, polyols, stabilizers, surfactants, etc., in order to obtain the desired polyurethane type, especially PU foam type.

In the inventive production of PU foams, preference is given to reacting at least one polyol component and at least one isocyanate component with one another, optionally in the presence of water, physical or chemical blowing agents, flame retardants, catalysts and/or further additives, alongside use of SiOC-linked, linear polydialkylsiloxane-polyoxyalkylene block copolymers having repeat (AB) units, referred to in the context of this invention as component (e).

Further details of the usable starting materials, catalysts as well as auxiliaries and additives can also be found e.g. in Kunststoffhandbuch [Plastics Handbook], volume 7, Polyurethane [Polyurethanes], Carl-Hanser-Verlag Munich, 1st edition 1966, 2nd edition 1983 and 3rd edition 1993. The compounds, components and additives below are usable with preference.

The isocyanate components used are preferably one or more organic polyisocyanates having two or more isocyanate functions. The polyol components used are preferably one or more polyols having two or more isocyanate-reactive groups.

Isocyanates suitable as isocyanate components for the purposes of this invention are all isocyanates containing at least two isocyanate groups. It is generally possible to use all aliphatic, cycloaliphatic, arylaliphatic and preferably aromatic polyfunctional isocyanates known per se. Preference is given to using isocyanates within a range from 60 to 350 mol %, more preferably within a range from 60 to 140 mol %, relative to the sum of the isocyanate-consuming components.

Examples include alkylene diisocyanates having 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate (HMDI), cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (isophorone diisocyanate or IPDI for short), hexahydrotolylene 2,4- and 2,6-diisocyanate and also the corresponding isomer mixtures, and preferably aromatic diisocyanates and polyisocyanates, for example tolylene 2,4- and 2,6-diisocyanate (TDI) and the corresponding isomer mixtures, mixtures of diphenylmethane 2,4'- and 2,2'-diisocyanates (MDI) and polyphenylpolymethylene polyisocyanates (crude MDI) and mixtures of crude MDI and tolylene diisocyanates (TDI). The organic diisocyanates and polyisocyanates may be used individually or in the form of mixtures thereof.

It is also possible to use isocyanates that have been modified by the incorporation of urethane, uretdione, isocyanurate, allophanate and other groups, which are termed modified isocyanates.

Particularly suitable organic polyisocyanates that are therefore used with particular preference are various isomers of tolylene diisocyanate (tolylene 2,4- and 2,6-diisocyanate (TDI), in pure form or as isomer mixtures of varying composition), diphenylmethane 4,4'-diisocyanate (MDI), "crude MDI" or "polymeric MDI" (containing the 4,4' isomer and also the 2,4' and 2,2' isomers of MDI and products having more than two rings) and also the two-ring product that is referred to as "pure MDI" and is composed predominantly of 2,4' and 4,4' isomer mixtures, and prepolymers derived therefrom. Examples of particularly suitable isocyanates are detailed, for example, in EP 1712578, EP 1161474, WO 00/58383, US 2007/0072951, EP 1678232 and WO 2005/085310, which are hereby fully incorporated by reference.

Polyols suitable as the polyol component for the purposes of the present invention are all organic substances having two or more isocyanate-reactive groups, preferably OH groups, and also formulations thereof. Preferred polyols include all polyether polyols and/or polyester polyols and/or hydroxyl-containing aliphatic polycarbonates, especially polyether polycarbonate polyols and/or natural oil-based polyols (NOPs) that are typically used for production of polyurethane systems, especially PU foams. The polyols usually have a functionality from 1.8 to 8 and number-average molecular weights within a range from 500 to 15,000 g/mol. Polyols having OH values within a range from 10 to 1200 mg KOH/g are typically used. The number-average molecular weights are usually determined by gel permeation chromatography (GPC), especially using polypropylene glycol as reference substance and tetrahydrofuran (THF) as eluent. The OH values can, in particular, be determined in accordance with DIN standard DIN 53240: 1971-12.

Polyether polyols usable with preference may be produced by known methods, for example by anionic polymerization of alkylene oxides in the presence of alkali metal hydroxides, alkali metal alkoxides or amines as catalysts and by addition of at least one starter molecule, preferably containing 2 or 3 reactive hydrogen atoms in bonded form, or by cationic polymerization of alkylene oxides in the presence of Lewis acids, for example antimony pentachloride or boron trifluoride etherate, or by double metal cyanide catalysis. Suitable alkylene oxides contain from 2 to 4 carbon atoms in the alkylene radical. Examples are tetrahydrofuran, 1,3-propylene oxide, 1,2-butylene oxide and 2,3-butylene oxide; ethylene oxide and 1,2-propylene oxide are preferably used. The alkylene oxides may be used individually, cumulatively, in blocks, in alternation or as mixtures. Starter molecules used may especially be compounds having at least 2, preferably 2 to 8, hydroxyl groups, or having at least two primary amino groups in the molecule. Starter molecules used may, for example, be water, di-, tri- or tetrahydric alcohols, such as ethylene glycol, propane-1,2- and -1,3-diol, diethylene glycol, dipropylene glycol, glycerol, trimethylolpropane, pentaerythritol, castor oil, etc., higher polyfunctional polyols, especially sugar compounds, for example glucose, sorbitol, mannitol and sucrose, polyhydric phenols, resols, for example oligomeric condensation products of phenol and formaldehyde and Mannich condensates of phenols, formaldehyde and dialkanolamines, and also melamine, or amines such as aniline, EDA, TDA, MDA and PMDA, more preferably TDA and PMDA. The choice of the suitable starter molecule depends on the particular field of use of the resulting polyether polyol in the polyurethane production (for example, polyols used for production of flexible PU foams are different from those used in the production of rigid PU foams).

Polyester polyols usable with preference are based on esters of polybasic aliphatic or aromatic carboxylic acids, preferably having 2 to 12 carbon atoms. Examples of aliphatic carboxylic acids are succinic acid, glutaric acid, adipic acid, suberic acid, azelaic acid, sebacic acid, decanedicarboxylic acid, maleic acid and fumaric acid. Examples of aromatic carboxylic acids are phthalic acid, isophthalic acid, terephthalic acid and the isomeric naphthalenedicarboxylic acids. The polyester polyols are obtained by condensation of these polybasic carboxylic acids with polyhydric alcohols, preferably of diols or triols having 2 to 12, more preferably having 2 to 6, carbon atoms, preferably trimethylolpropane and glycerol.

Polyether polycarbonate polyols usable with preference are polyols containing carbon dioxide bound in the form of carbonate. Since carbon dioxide is formed as a by-product in large volumes in many processes in the chemical industry, the use of carbon dioxide as comonomer in alkylene oxide polymerizations is of particular interest from a commercial viewpoint. Partial replacement of alkylene oxides in polyols with carbon dioxide has the potential to distinctly lower the costs for the production of polyols. Moreover, the use of $CO_2$ as comonomer is very environmentally advantageous, since this reaction constitutes the conversion of a greenhouse gas into a polymer. The preparation of polyether polycarbonate polyols by addition of alkylene oxides and carbon dioxide to H-functional starter substances with the use of catalysts is well known. Various catalyst systems may be used here: The first generation were heterogeneous zinc or aluminium salts, as described e.g. in U.S. Pat. No. 3,900,424 or U.S. Pat. No. 3,953,383. In addition, mono- and binuclear metal complexes have been used successfully for copolymerization of $CO_2$ and alkylene oxides (WO 2010/028362, WO 2009/130470, WO 2013/022932 or WO 2011/163133). The most important class of catalyst systems for the copolymerization of carbon dioxide and alkylene oxides is that of double metal cyanide catalysts, also referred to as DMC catalysts (U.S. Pat. No. 4,500,704, WO 2008/058913). Suitable alkylene oxides and H-functional starter substances are those also used for preparing carbonate-free polyether polyols, as described above.

Polyols usable with preference that are based on natural oil-based polyols (NOPs) as renewable raw materials for the production of PU foams are of increasing interest with regard to the long-term limits in the availability of fossil resources, namely oil, coal and gas, and against the background of rising crude oil prices, and have already been described many times in such applications (WO 2005/033167; US 2006/0293400, WO 2006/094227, WO 2004/096882, US 2002/0103091, WO 2006/116456 and EP 1678232). A number of such polyols are now available on the market from various manufacturers (WO2004/020497, US2006/0229375, WO2009/058367). Polyols having a varying property profile are obtained, depending on the base raw material (e.g. soybean oil, palm oil or castor oil) and subsequent workup. A distinction may essentially be made between two groups: a) polyols based on renewable raw materials that are modified such that they may be used to an extent of 100% in the production of polyurethanes (WO2004/020497, US2006/0229375); b) polyols based on renewable raw materials that on account of their processing and properties are able to replace the petrochemical-based polyol only up to a certain proportion (WO2009/058367).

A further class of polyols usable with preference are so-called filled polyols (polymer polyols). A feature of these is that they contain dispersed solid organic fillers up to a solids content of 40% or more. Usable polyols include SAN, PUD and PIPA polyols. SAN polyols are highly reactive polyols containing a dispersed copolymer based on styrene-acrylonitrile (SAN). PUD polyols are highly reactive polyols containing polyurea, likewise in dispersed form. PIPA polyols are highly reactive polyols containing a dispersed polyurethane, formed for example by in-situ reaction of an isocyanate with an alkanolamine in a conventional polyol.

The solids content, which, depending on the application, is preferably between 5% and 40% based on the polyol, is responsible for improved cell opening, with the result that the polyol may be foamed in a controlled manner, especially with TDI, without shrinkage of the foams occurring. The solids content thus acts as an essential processing aid. A further function is to control the hardness via the solids content, since higher solids contents impart greater hardness to the foam. Formulations comprising polyols that contain solids have markedly reduced inherent stability and therefore tend to require not only chemical stabilization via the crosslinking reaction but also additional physical stabilization. Depending on the solids contents of the polyols, these can be used for example alone or for example in a blend with the above-mentioned unfilled polyols.

A further class of polyols usable with preference comprises polyols obtained as prepolymers by reaction of polyol with isocyanate in a molar ratio of 100:1 to 5:1, preferably 50:1 to 10:1. Such prepolymers are preferably made up in the form of a solution in polymer, with the polyol preferably corresponding to the polyol used for preparing the prepolymers.

A further class of polyols usable with preference is that of the so-called autocatalytic polyols, especially autocatalytic polyether polyols. Polyols of this kind are based, for example, on polyether blocks, preferably on ethylene oxide and/or propylene oxide blocks, and additionally include catalytically active functional groups, for example nitrogen-containing functional groups, especially amino groups, preferably tertiary amine functions, urea groups and/or heterocycles containing nitrogen atoms. Through the use of such autocatalytic polyols in the production of PU foams, preferably flexible PU foams, it may be possible, depending on the application, to reduce the required amount of any catalysts additionally used and/or to tailor them to specific desired foam properties. Suitable polyols are described e.g. in WO0158976 (A1), WO2005063841 (A1), WO0222702 (A1), WO2006055396 (A1), WO03029320 (A1), WO0158976 (A1), U.S. Pat. No. 6,924,321 (B2), U.S. Pat. No. 6,762,274 (B2), EP2104696 (B1), WO2004060956 (A1) and WO2013102053 (A1) and can be obtained e.g. under the Voractiv™ and/or SpecFlex™ Activ trade names from Dow.

Depending on the required properties of the resulting foams, appropriate polyols may advantageously be used, such as those described e.g. in: US 2007/0072951 A1, WO 2007/111828, US 2007/0238800, U.S. Pat. No. 6,359,022 and WO 96/12759. Further polyols are known to those skilled in the art and can be found e.g. in EP-A-0380993 or U.S. Pat. No. 3,346,557, to which reference is made in full.

In a preferred embodiment of the invention, especially for production of molded and highly resilient flexible PU foams, di- and/or trifunctional polyether alcohols are used in which the proportion of primary hydroxyl groups is preferably above 50%, more preferably above 80%, especially those having an ethylene oxide block at the chain end. Depending on the required properties in this preferred embodiment according to the invention, especially for production of the above-mentioned foams, preference is given to using not only the polyether alcohols described here but also further polyether alcohols that bear primary hydroxyl groups and are based predominantly on ethylene oxide, in particular having a proportion of ethylene oxide blocks of >70%, preferably >90%. All polyether alcohols described for the purposes of this preferred embodiment preferably have a functionality from 2 to 8, more preferably from 2 to 5, number-average molecular weights within a range from 2500 to 15,000, preferably 4500 to 12,000, and typically OH values within a range from 5 to 80, preferably 20 to 50, mg KOH/g.

In a further preferred embodiment of the invention, especially for production of flexible slabstock PU foam, di- and/or trifunctional polyether alcohols are used in which the proportion of secondary hydroxyl groups is preferably above 50%, more preferably above 90%, especially those having a propylene oxide block or random propylene oxide and ethylene oxide block at the chain end, or those based solely on propylene oxide blocks. Such polyether alcohols preferably have a functionality from 2 to 8, more preferably from 2 to 4, number average molecular weights within a range from 500 to 8000, preferably 800 to 5000, more preferably 2500 to 4500 g/mol, and usually OH values within a range from 10 to 100, preferably 20 to 60, mg KOH/g. In a further preferred embodiment of the invention, especially for production of PU foams, preferably of flexible PU foams, preferably for production of molded and highly resilient flexible foams, autocatalytic polyols as described above are used.

In a further preferred embodiment of the invention, especially for production of flexible PU-polyester foams, polyester alcohols based on diols and/or triols, preferably glycerol and/or trimethylolpropane, and aliphatic carboxylic acids, preferably adipic acid, suberic acid, azelaic acid and/or sebacic acid, are used. Such polyester alcohols preferably have a functionality of 2 to 4, more preferably 2 to 3, number-average molecular weights within a range from 200-4000, preferably 400-3000 and more preferably 600-2500 g/mol, and typically OH values in the range of 10-1000, preferably 20-500 and more preferably 30-300, mg KOH/g.

In a further preferred embodiment of the invention, especially for production of rigid polyisocyanurate (PIR) foams, polyester alcohols based on diols and/or triols, preferably monoethylene glycol, and aromatic carboxylic acids, preferably phthalic acid and/or terephthalic acid, are used. Such polyester alcohols preferably have a functionality of 2 to 4, more preferably 2 to 3, number-average molecular weights within a range from 200-1500, preferably 300-1200 and more preferably 400-1000 g/mol, and typically OH values within a range from 100-500, preferably 150-300 and more preferably 180-250, mg KOH/g.

In a further preferred embodiment of the invention, especially for production of rigid PU foams, di- to octafunctional polyether alcohols are used in which the proportion of secondary hydroxyl groups is preferably above 50%, more preferably above 90%, especially those having a propylene oxide block or random propylene oxide and ethylene oxide block at the chain end, or those based solely on propylene oxide blocks. Such polyether alcohols preferably have a functionality of 2 to 8, more preferably 3 to 8, number-average molecular weights within a range from 500 to 2000, preferably 800 to 1200 g/mol, and typically OH values within a range from 100 to 1200, preferably 120 to 700 and more preferably 200 to 600, mg KOH/g. Depending on the required properties of these preferred foams according to the invention, besides the polyols described herein it is additionally possible to use polyether alcohols having comparatively high number-average molecular weights and comparatively low OH values as described above and/or additional polyester polyols based on aromatic carboxylic acids as described above.

In a further preferred embodiment of the invention, especially for production of viscoelastic PU foams, preference is given to using mixtures of various, preferably two or three, polyfunctional polyester alcohols and/or polyether alcohols. The polyol combinations used here typically consist of a low-molecular-weight crosslinker polyol, for example a rigid foam polyol, of high functionality (>3) and/or a conventional high-molecular-weight flexible slabstock foam or HR polyol and/or a hypersoft polyether polyol having a high proportion of ethylene oxide blocks and having cell-opening properties.

A preferred ratio of isocyanate and polyol, expressed as the index of the formulation, i.e. as the stoichiometric ratio of isocyanate groups to isocyanate-reactive groups (e.g. OH groups, NH groups) multiplied by 100, is within a range from 10 to 1000, preferably 40 to 350, more preferably 70 to 140. An index of 100 represents a molar ratio of reactive groups of 1:1.

Catalysts used in the context of this invention may, for example, be any catalysts for the isocyanate-polyol (urethane formation) and/or isocyanate-water (amine and carbon dioxide formation) and/or isocyanate dimerization (uretdione formation), isocyanate trimerization (isocyanurate formation), isocyanate-isocyanate with $CO_2$ elimination (carbodiimide formation) and/or isocyanate-amine (urea formation) reactions and/or "secondary" crosslinking reactions such as isocyanate-urethane (allophanate formation) and/or isocyanate-urea (biuret formation) and/or isocyanate-carbodiimide (uretonimine formation).

Examples of suitable catalysts for the purposes of the present invention are substances that catalyse one of the above-mentioned reactions, especially the gelling reaction (isocyanate-polyol), the blowing reaction (isocyanate-water) and/or isocyanate dimerization or trimerization. Such catalysts are preferably nitrogen-containing compounds, especially amines and ammonium salts, and/or metal compounds.

Suitable nitrogen compounds as catalysts, also referred to hereinafter as nitrogen-containing catalysts, are for the purposes of the present invention all nitrogen compounds according to the prior art that catalyse one of the above-mentioned isocyanate reactions and/or can be used for the production of polyurethanes, especially of polyurethane foams.

Examples of suitable additional nitrogen compounds as catalysts for the purposes of the present invention are the amines triethylamine, triethanolamine, diethanolamine, N,N-dimethylcyclohexylamine, N,N-dicyclohexylmethylamine, N,N-dimethylaminoethylamine, N,N,N'N'-tetramethylethane-1,2-diamine, N,N,N',N'-tetramethylpropane-1,3-diamine, N,N,N',N'-tetramethylbutane-1,4-diamine, N,N,N',N'-tetramethylhexane-1,6-diamine, N-[2-(dimethylamino)ethyl]-N,N'N'-trimethyl-1,2-ethanediamine, 2-[(2-(dimethylamino)ethyl)methylamino]ethanol, N'N'-dimethylpropane-1,3-diamine, N',N'-diethylpropane-1,3-diamine, 1-(2-aminoethyl)pyrrolidine, 1-(3-aminopropyl)pyrrolidine, 1-[3-(dimethylamino)propyl-(2-hydroxypropyl)amino]propan-2-ol, 2-[[3-(dimethylamino)propyl]methylamino]ethanol, 3-(2-dimethylamino)ethoxy)propylamine, N-[3-(dimethylamino)propyl]-N',N'-dimethylpropane-1,3-diamine, N'-[3-(dimethylamino)propyl]-N,N,N'-trimethylpropane-1,3-diamine, 1-[bis[3-(dimethylamino)propyl]amino]-2-propanol, N,N-bis[3-(dimethylamino)propyl]-N',N'-dimethylpropane-1,3-diamine, 1,4-diazabicyclo[2.2.2]octane, 1,4-diazabicyclo[2.2.2]octane-2-methanol, 1,2-dimethylimidazole, N-(2-hydroxypropyl)imidazole, 2-methyl-1-(2-methylpropyl)imidazole, N-(3-aminopropyl)imidazole, N-methylimidazole, 1-(3-aminopropyl)-2-methyl-1H-imidazole, N-ethylmorpholine, N-methylmorpholine, 2,2,4-trimethyl-2-silamorpholine, N-ethyl-2,2-dimethyl-2-silamorpholine, N-(2-aminoethyl)morpholine, N-(2-hydroxyethyl)morpholine, 2,2'-dimorpholinodiethyl ether, N,N'-dimethylpiperazine, N-(2-hydroxyethyl)piperazine, N-(2-aminoethyl)piperazine, N,N-dimethylbenzylamine, N,N-(dimethylamino)ethanol, N,N-(diethylamino)ethanol, 1-(2-hydroxyethyl)pyrrolidine, 3-dimethylamino-1-propanol, 1-(3-hydroxypropyl)pyrrolidine, 2-[2-(dimethylamino)ethoxy]ethanol, 2-[2-(diethylamino)ethoxy]ethanol, bis(2-dimethylaminoethyl) ether, 2-[[2-(2-(dimethylamino)ethoxy)ethyl]methylamino]ethanol, N-[2-[2-(dimethylamino)ethoxy]ethyl]-N-methyl-1,3-propanediamine, 1,3,5-tris[3-(dimethylamino)propyl]hexahydro-1,3,5-triazine, 1,8-diazabicyclo[5.4.0]undec-7-ene, 1,5-diazabicyclo[4.3.0]non-5-ene, 1,5,7-triazabicyclo[4.4.0]dec-5-ene, N-methyl-1,5,7-triazabicyclo[4.4.0]dec-5-ene, 1,4,6-triazabicyclo[3.3.0]oct-4-en, 1,1,3,3-tetramethylguanidine, 2-tert-butyl-1,1,3,3-tetramethylguanidine, guanidine, 1,1'-[(3-{bis[3-(dimethylamino)propyl]amino}propyl)imino]dipropan-2-ol, (3-aminopropyl)bis[3-(dimethylamino)propyl]amine, 3-(dimethylamino)propylurea, 1,3-bis[3-(dimethylamino)propyl]urea, 3-dimethylamino-N,N-dimethylpropanamide, 6-(dimethylamino)hexan-1-ol and 2,4,6-tris[(dimethylamino)methyl]phenol.

Catalysts and/or mixtures of this kind are supplied commercially, for example under the Jeffcat® ZF-10, Lupragen® DMEA, Lupragen® API, Toyocat® RX 20 and Toyocat® RX 21, DABCO® RP 202, DABCO® RP 204, DABCO® NE 300, DABCO® NE 310, DABCO® NE 400, DABCO® NE 500, DABCO® NE 600, DABCO® NE 650, DABCO® NE 660, DABCO® NE 740, DABCO® NE 750, DABCO® NE 1060, DABCO® NE 1080, DABCO® NE 1082 and also DABCO® NE 2039 and Tegoamin® ZE 1 names. Suitable nitrogen-containing catalysts known from the prior art may be obtained for example from Evonik under the trade names TEGOAMIN® and DABCO®.

Depending on the application, it may be preferable that, in the inventive production of polyurethane foams, quaternized and/or protonated nitrogen-containing catalysts, especially quaternized and/or protonated tertiary amines, are used.

For possible quaternization of nitrogen-containing catalysts, it is possible to use any reagents known as quaternizing reagents. As the quaternizing agent, preference is given to using alkylating agents such as dimethyl sulfate, methyl chloride or benzyl chloride, preferably methylating agents such as, in particular, dimethyl sulfate. Quaternization can likewise be carried out using alkylene oxides, such as ethylene oxide, propylene oxide or butylene oxide, preferably followed by neutralization with inorganic or organic acids.

Nitrogen-containing catalysts, if quaternized, may be singly or multiply quaternized. Preferably, the nitrogen-containing catalysts are only singly quaternized. If singly quaternized, the nitrogen-containing catalysts are preferably quaternized at a tertiary nitrogen atom.

Nitrogen-containing catalysts may be converted to the corresponding protonated compounds by reaction with organic or inorganic acids. These protonated compounds may for example be preferable when e.g. a slowed polyurethane reaction is to be achieved or when the reaction mixture needs to have enhanced flow behavior in use.

Organic acids used may, for example, be any organic acids mentioned hereinafter, for example carboxylic acids having from 1 to 36 carbon atoms (aromatic or aliphatic, linear or branched), for example formic acid, lactic acid, 2-ethylhexanoic acid, salicylic acid and neodecanoic acid, or else polymeric acids such as polyacrylic or polymethacrylic acids. Inorganic acids used may, for example, be phosphorus-based acids, sulfur-based acids or boron-based acids.

The use of nitrogen-containing catalysts that have not been quaternized or protonated is however particularly preferable for the purposes of this invention.

Suitable metal compounds as catalysts, also referred to hereinafter as metal-containing catalysts, are for the purposes of the present invention all metal compounds according to the prior art that catalyse one of the above-mentioned isocyanate reactions and/or can be used for the production of polyurethanes, especially of polyurethane foams. They may be selected, for example, from the group consisting of metal-organic or organometallic compounds, metal-organic or organometallic salts, organic metal salts, inorganic metal salts, and from the group consisting of charged or uncharged metal coordination compounds, especially metal chelate complexes.

The expression "metal-organic or organometallic compounds" encompasses for the purposes of this invention in particular the use of metal compounds having a direct carbon-metal bond, here also referred to as metal organyls (e.g. tin organyls) or organometallic/organometal compounds (e.g. organotin compounds). The expression "organometallic or metal-organic salts" encompasses for the purposes of this invention in particular the use of metal-organic or organometallic compounds having salt character, i.e. ionic compounds in which either the anion or cation is metal-organic in nature (e.g. organotin oxides, organotin chlorides or organotin carboxylates). The expression "organic metal salts" encompasses for the purposes of this invention in particular the use of metal compounds that do not have any direct carbon-metal bond and are at the same time metal salts in which either the anion or the cation is an organic compound (e.g. tin(II) carboxylates). The expression "inorganic metal salts" encompasses for the purposes of this invention in particular the use of metal compounds or of metal salts in which neither the anion nor the cation is an organic compound, e.g. metal chlorides (e.g. tin(II) chloride), pure metal oxides (e.g. tin oxides) or mixed metal oxides, i.e. containing a plurality of metals, and/or metal silicates or aluminosilicates. The expression "coordination compound" encompasses for the purposes of this invention in particular the use of metal compounds formed from one or more central particles and one or more ligands, the central particles being charged or uncharged metals (e.g. metal- or tin-amine complexes). The expression "metal-chelate complexes" encompasses for the purposes of this invention in particular the use of metal coordination compounds that have ligands containing at least two sites of coordination or bonding to the metal centre (e.g. metal/tin polyamine complexes or metal/tin polyether complexes).

Suitable metal compounds, especially as defined above, as possible catalysts for the purposes of the present invention may be selected, for example, from all metal compounds containing lithium, sodium, potassium, magnesium, calcium, scandium, yttrium, titanium, zirconium, vanadium, niobium, chromium, molybdenum, tungsten, manganese, cobalt, nickel, copper, zinc, mercury, aluminium, gallium, indium, germanium, tin, lead, and/or bismuth, especially sodium, potassium, magnesium, calcium, titanium, zirconium, molybdenum, tungsten, zinc, aluminium, tin and/or bismuth, more preferably tin, bismuth, zinc and/or potassium.

Suitable organometallic salts and organic metal salts, especially as defined above, as catalysts for the purposes of the present invention are, for example, organotin, tin, zinc, bismuth and potassium salts, especially corresponding metal carboxylates, alkoxides, thiolates and mercaptoacetates, for example dibutyltin diacetate, dimethyltin dilaurate, dibutyltin dilaurate (DBTDL), dioctyltin dilaurate (DOTDL), dimethyltin dineodecanoate, dibutyltin dineodecanoate, dioctyltin dineodecanoate, dibutyltin dioleate, dibutyltin bis(n-lauryl mercaptide), dimethyltin bis(n-lauryl mercaptide), monomethyltin tris(2-ethylhexyl mercaptoacetate), dimethyltin bis(2-ethylhexyl mercaptoacetate), dibutyltin bis(2-ethylhexyl mercaptoacetate), dioctyltin bis(isooctyl mercaptoacetate), tin(II) acetate, tin(II) 2-ethylhexanoate (tin(II) octoate), tin(II) isononanoate (tin(II) 3,5,5-trimethylhexanoate), tin(II) neodecanoate, tin(II) ricinoleate, tin(II) oleate, zinc(II) acetate, zinc(II) 2-ethylhexanoate (zinc(II) octoate), zinc(II) isononanoate (zinc(II) 3,5,5-trimethylhexanoate), zinc(II) neodecanoate, zinc(II) ricinoleate, bismuth acetate, bismuth 2-ethylhexanoate, bismuth octoate, bismuth isononanoate, bismuth neodecanoate, potassium formate, potassium acetate, potassium 2-ethylhexanoate (potassium octoate), potassium isononanoate, potassium neodecanoate and/or potassium ricinoleate.

In the inventive production of polyurethane foams, it may be preferable to exclude the use of organometallic salts, for example of dibutyltin dilaurate.

As a general rule, suitable possible metal-containing catalysts are preferably selected such that they do not have any troublesome intrinsic odor and are essentially toxicologically safe, and such that the resulting polyurethane systems, especially polyurethane foams, have the lowest possible degree of catalyst-related emissions.

In the inventive production of polyurethane foams, it may be preferable, according to the type of application, to use incorporable/reactive or high-molecular-weight catalysts. Catalysts of this kind may be selected, for example, from the group consisting of metal compounds, preferably from the group consisting of tin, zinc, bismuth and/or potassium compounds, especially from the group consisting of metal carboxylates of the above-mentioned metals, for example the tin, zinc, bismuth and/or potassium salts of isononanoic acid, neodecanoic acid, ricinoleic acid and/or oleic acid, and/or from the group consisting of nitrogen compounds, especially from the group consisting of low-emission amines and/or low-emission compounds containing one or more tertiary amine groups.

Depending on the application, it may be preferable that, in the inventive production of polyurethane foams, one or more nitrogen-containing and/or metal-containing catalysts are used. When more than one catalyst is used, the catalysts may be used in any desired mixtures with one another. It is possible here to use the catalysts individually during the foaming operation, for example in the manner of preliminary dosing in the mixing head, and/or in the form of a premixed catalyst combination.

The expression "premixed catalyst combination", also referred to hereinafter as catalyst combination, encompasses for the purposes of this invention in particular pre-prepared mixtures of metal-containing catalysts and/or nitrogen-containing catalysts and/or corresponding protonated and/or quaternized nitrogen-containing catalysts, and optionally also further ingredients or additives, for example water, organic solvents, acids for blocking the amines, emulsifiers, surfactants, blowing agents, antioxidants, flame retardants, stabilizers and/or siloxanes, preferably polyether siloxanes, that are already present as such prior to foaming and do not need to be added as individual components during the foaming operation.

Depending on the application, it may be preferable when the sum of all the nitrogen-containing catalysts used relative to the sum of the metal-containing catalysts, especially potassium, zinc and/or tin catalysts, results in a molar ratio of 1:0.05 to 0.05:1, preferably 1:0.07 to 0.07:1 and more preferably 1:0.1 to 0.1:1.

In order to prevent any reaction of the components with one another, especially reaction of nitrogen-containing catalysts with metal-containing catalysts, especially potassium, zinc and/or tin catalysts, it may be preferable to store these components separately from one another and then to feed in the isocyanate and polyol reaction mixtures simultaneously or successively.

Suitable amounts of catalysts to be used are guided by the type of catalyst and are preferably within a range from 0.005 to 10.0 pphp, more preferably within a range from 0.01 to 5.00 pphp (=parts by weight based on 100 parts by weight of polyol) or 0.10 to 10.0 pphp for potassium salts.

Preferred water contents in the process according to the invention depend on whether or not physical blowing agents are used in addition to any water that can optionally be used. In the case of purely water-blown foams, values typically range from preferably 1 to 20 pphp; when other blowing agents are additionally used, the amount of water used is reduced to usually e.g. 0 or e.g. 0.1 to 5 pphp. To achieve high foam densities, preferably neither water nor any other blowing agent is used.

Suitable physical blowing agents optionally usable for the purposes of this invention are gases, for example liquefied $CO_2$, and volatile liquids, e.g. hydrocarbons having 4 or 5 carbon atoms, oxygen-containing compounds such as methyl formate and dimethoxymethane, or chlorinated hydrocarbons, preferably dichloromethane and 1,2-dichloroethane. Suitable blowing agents further include ketones (e.g. acetone) or aldehydes (e.g. methylal).

In addition to or in lieu of any water and any physical blowing agents, it is also possible to use other chemical blowing agents that react with isocyanates with gas evolution, examples being formic acid, carbamates or carbonates.

Suitable stabilizers against oxidative degradation, termed antioxidants, preferably include all common free-radical scavengers, peroxide scavengers, UV absorbers, light stabilizers, complexing agents for metal ion impurities (metal deactivators). Preference is given to using compounds of the following classes of substances, or classes of substances containing the following functional groups, substituents on the respective parent molecules preferably being especially substituents bearing groups that are reactive toward isocyanate: 2-(2'-hydroxyphenyl)benzotriazoles, 2-hydroxybenzophenones, benzoic acids and benzoates, phenols, especially those having tert-butyl and/or methyl substituents on the aromatic ring, benzofuranones, diarylamines, triazines, 2,2, 6,6-tetramethylpiperidines, hydroxylamines, alkyl and aryl phosphites, sulfides, zinc carboxylates, diketones. Phenols used may, for example, be esters based on 3-(4-hydroxyphenyl)propionic acid, such as triethylene glycol bis[3-(3-tert-butyl-4-hydroxy-5-methylphenyl)propionate], octadecyl 3-(3,5-di-tert-butyl-4-hydroxyphenyl)propionate, or methylenediphenols such as 4,4'-butylidenebis(6-tert-butyl-3-methylphenol). Examples of preferred 2-(2'-hydroxyphenyl)benzotriazoles are 2-(2'-hydroxy-5'-methylphenyl)benzotriazole or 2-(2'-hydroxy-3',5'-di-tert-butylphenyl)benzotriazole. Examples of preferred 2-hydroxybenzophenones are 2-hydroxy-4-n-octoxybenzophenone, 2,2',4,4'-tetrahydroxybenzophenone or 2,4-dihydroxybenzophenone. Examples of preferred benzoates are hexadecyl 3,5-di-tert-butyl-4-hydroxybenzoate or tannins.

Suitable flame retardants for the purposes of this invention are all substances regarded as suitable for this purpose according to the prior art. Examples of preferred flame retardants are liquid organophosphorus compounds such as halogen-free organophosphates, e.g. triethyl phosphate (TEP), halogenated phosphates, e.g. tris(1-chloro-2-propyl) phosphate (TCPP) and tris(1,3-dichloroisopropyl)phosphate (TDCPP), and organic phosphonates, e.g. dimethyl methanephosphonate (DMMP) and dimethyl propanephosphonate (DMPP), or solids such as ammonium polyphosphate (APP) and red phosphorus. Suitable flame retardants further include halogenated compounds, e.g. halogenated polyols, and also solids such as expandable graphite and melamine.

Biocides used may, for example, be commercial products such as chlorophene, benzisothiazolinone, hexahydro-1,3,5-tris(hydroxyethyl-s-triazine), chloromethylisothiazolinone, methylisothiazolinone or 1,6-dihydroxy-2,5-dioxohexane, which are known by the trade names BIT 10, Nipacide BCP, Acticide MBS, Nipacide BK, Nipacide CI, Nipacide FC.

The foam properties of PU foams can be influenced in the course of their production especially through the use of siloxanes or organomodified siloxanes; this may be done using the substances cited in the prior art. Preference is given to using compounds that are particularly suitable for the respective PU foam types (rigid PU foams, hot-cure flexible PU foams, viscoelastic PU foams, ester-type PU foams, cold-cure flexible PU foams (HR PU foams), semi-rigid PU foams). Suitable (organomodified) siloxanes are described e.g. in the following documents: EP 0839852, EP 1544235, DE 102004001408, EP 0839852, WO 2005/118668, US 20070072951, DE 2533074, EP 1537159, EP 533202, U.S. Pat. No. 3,933,695, EP 0780414, DE 4239054, DE 4229402, EP 867465. These compounds may be prepared as described in the prior art. Suitable examples are described e.g. in U.S. Pat. No. 4,147,847, EP 0493836 and U.S. Pat. No. 4,855,379.

The component (e) to be used according to the invention acts as a foam stabilizer and cell opener.

Additional foam stabilizers used may be any stabilizers known from the prior art. There accordingly follows a description firstly of the additionally usable foam stabilizers, the use of which is optional:

Preference is given to using, as additional foam stabilizers, those based on polydialkylsiloxane-polyoxyalkylene copolymers, as generally used in the production of urethane foams. The structure of these compounds is preferably such that, for example, a long-chain copolymer of ethylene oxide and propylene oxide is attached to a polydimethylsiloxane radical. The linkage between the polydialkylsiloxane and the polyether moiety may be via an SiC bond or Si—O—C linkage. In structural terms, the polyether or different polyethers may be attached to the polydialkylsiloxane in terminal or lateral positions. The alkyl radical or various alkyl radicals may here be aliphatic, cycloaliphatic or aromatic. Methyl groups are very particularly advantageous. The polydialkylsiloxane may be linear or else contain branches. Suitable foam stabilizers are described e.g. in the following documents: EP 0839852, EP 1544235, DE 102004001408, WO 2005/118668, US 2007/0072951, DE 2533074, EP 1537159, EP 533202, U.S. Pat. No. 3,933,695, EP 0780414, DE 4239054, DE 4229402, EP 867465. The corresponding Si compounds may be prepared as described in the prior art. Suitable examples are described e.g. in U.S. Pat. No. 4,147,847, EP 0493836 and U.S. Pat. No. 4,855,379. Suitable stabilizers can be obtained from Evonik Industries AG under the TEGOSTAB® trade name.

Suitable siloxanes that may additionally be used especially have the following structure:

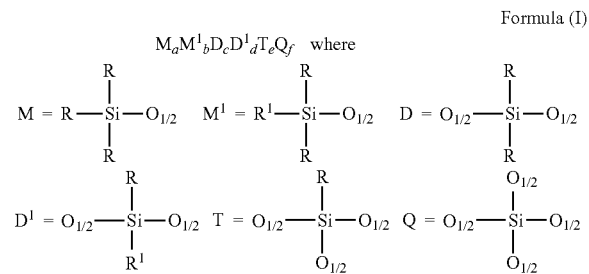

Formula (I)

a=0-20, preferably 0-10, especially 0 and 2,
b=0-20, preferably 0-10, especially 0-7,
c=3-450, preferably 5-350, especially 10-250,
d=0-40, preferably 1-30, especially 1.5-20,
e=0-20, preferably 0-10, especially 0,
f=0-20, preferably 0-10, especially 0,
where a+b≥2 and N=a+b+c+d+e+f≥11 and ≤500, b+d≥1
R=independently identical or different alkyl radicals having 1-16 carbon atoms or aryl radicals having 6-16 carbon atoms or H or —OR$^2$, preferably methyl, ethyl, phenyl, octyl, dodecyl or H, especially methyl,
R$^1$=independently identical or different polyether radicals, preferably identical or different polyether radicals of the general formula (II)

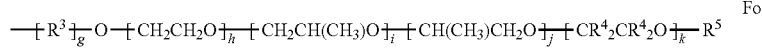

Formula (II)

R$^2$=independently identical or different alkyl radicals having 1-16 carbon atoms or aryl radicals having 6-16 carbon atoms or H,
R$^3$=identical or different hydrocarbon radicals having 1-18 carbon atoms, preferably —CH$_2$—CH$_2$—CH$_2$— or —CH$_2$—CH(CH$_3$)—CH$_2$—,
R$^4$=identical or different alkyl radicals having 1 to 18 carbon atoms that optionally have ether functions, or aryl radicals having 6-18 carbon atoms that optionally have ether functions, or H, preferably H, ethyl and benzyl,
R$^5$=identical or different radicals from the group consisting of R$^3$ and —C(O)R$^3$, preferably methyl, butyl, H or —C(O)Me, g=0 or 1,
h=0-100, preferably 0-80, especially preferably 3-50,
i=0-100, preferably 0-80, especially preferably 0-50,
j=0-100, preferably 0-80, especially preferably 0-50,
k=0-80, preferably 0-40, especially preferably 0.
with the proviso that h+i+j+k≥3, For description of the siloxanes, a notation analogous to the literature: Walter Noll, Chemie und Technologie der Silicone [Chemistry and Technology of the Silicones], Verlag Chemie GmbH, 2nd edition, 1968, is chosen here. The polyether siloxanes of the invention have different siloxane units that may be combined with one another within the molecule in different ways. Calculation of the composition of the siloxane units is based on the fact that each oxygen atom preferably functions as a bridging unit between two silicon atoms in each case, and consequently each silicon atom need only be counted as half. The various siloxane units are attached to one another via 2 half oxygen atoms (—O$_{1/2}$O$_{1/2}$—) groups, thereby forming an oxygen bridge (—O—).

The siloxanes of the formula (I) can be prepared by known methods, for example the noble metal-catalysed hydrosilylation reaction of compounds containing a double bond with appropriate hydrosiloxanes, as described e.g. in EP 1520870. The document EP 1520870 is hereby incorporated by reference and is considered to form part of the disclosure content of the present invention.

The foam stabilizers that may additionally be used, the use of which is optional, are described in the previous section.

The process according to the invention is executed using SiOC-linked, linear polydialkylsiloxane-polyoxyalkylene block copolymers having repeat (AB) units, obtainable through the reaction of polyether diols with equilibrated, preferably end-equilibrated, α,ω-diacetoxypolydialkylsiloxanes. The as yet unpublished European patent application under file reference 18189072.4 includes a precise description of a corresponding reaction to provide component (e). This reaction is effected by adding a solid, liquid or gaseous base, optionally with the use of inert solvents.

The manner in which component (e) can be obtained is both described in principle in the as yet unpublished European patent application under file reference 18189072.4 and also explained precisely hereinbelow for the purposes of the present invention. The following section accordingly relates to the provision of component (e). In the as yet unpublished European patent application under file reference 18189072.4 it was found that trifluoromethanesulfonic acid-acidified equilibrated α,ω-diacetoxysiloxanes may be produced by the reaction of siloxacycles (D$_4$ and/or D$_5$) with acetic anhydride in the presence of trifluoromethanesulfonic acid, as disclosed in the teaching of the as yet unpublished European patent applications under file references EP18189075.7 and EP18189074.0. In the as yet unpublished European patent application under file reference 18189072.4 it was established that trifluoromethanesulfonic acid-acidified equilibrated α,ω-diacetoxysiloxanes, and especially those described in EP18189075.7 and EP18189074.0, have sufficiently high reactivity to ensure that reaction thereof with α,ω-polyether diols affords the challenging high-molecular-weight SiOC-linked A(BA)$_n$ structures. Trifluoromethanesulfonic acid-acidified, equilibrated α,ω-diacetoxypolydialkylsiloxanes are obtainable when cyclic siloxanes, especially ones comprising D$_4$ and/or D$_5$, are reacted with acetic anhydride using trifluoromethanesulfonic acid as catalyst. The trifluoromethanesulfonic acid is preferably used in amounts of 0.1 to 0.3 percent by mass based on the reaction matrix consisting of acetic anhydride and cyclic siloxanes. The reaction is carried out preferably at temperatures of 140° C. to 160° C. and preferably over a period of 4 to 8 hours. The resulting equilibrated, preferably end-equilibrated, α,ω-diacetoxypolydialkylsiloxanes can then be brought to reaction with polyether diol(s) by adding a solid, liquid or gaseous base, optionally with the use of inert solvents. This reaction affords SiOC-linked, linear polydialkylsiloxane-polyoxyalkylene block copolymers having repeat (AB) units. Such reaction products may be used in the context of the present invention as component (e). Examples of preferred simple bases that may be used are carbonates and/or hydrogen carbonates of alkali metals and/or alkaline earth metals and/or gaseous ammonia and/or amines. Given the known tendency to condensation of acetoxysiloxanes, very particular preference is given here to those bases that, on account of their chemical composition, do not introduce any water into the reaction system. Thus, anhydrous carbonates are preferred over hydrogen carbonates and bases free from water of hydration are preferred over bases containing water of hydration. In view of the poor solubility of the alkali metal/alkaline earth metal carbonates and/or hydrogen carbonates in the reaction system, it is advantageous to opt for relatively high excesses thereof that preferably correspond to at least a 2000-fold stoichiometric equivalent of the trifluoromethanesulfonic acid present in the α,ω-diacetoxypolydialkylsiloxane. Very particular preference is given to the use of gaseous ammonia as the base, so that the acetic acid liberated during the reaction becomes bound as ammonium acetate. The amount of the solid, liquid or gaseous base introduced into the reaction system is preferably judged such that it is sufficient not only for neutralization of any trifluoromethanesulfonic acid still present in the system but also for precipitation in salt form of the acetate groups attached to the siloxane and for precipitation of the acetic anhydride still present in the reaction system and of any free acetic acid. The reaction is advantageously carried out at temperatures between 20° C. to 120° C., preferably between 20° C. and 70° C., over a duration of 1 to 10, preferably at least over a duration of 1 to 3, hours. The optionally trifluoromethanesulfonic acid-acidified, equilibrated, preferably end-equilibrated α,ω-diacetoxypolydialkylsiloxane may be initially charged with polyether diol(s) at temperatures of <25° C., followed by introduction of ammonia. This variant carried out with substantial addition of ammonia binds not only any trifluoromethanesulfonic acid, but also acetic anhydride and any free acetic acid still present in the reaction system as ammonium acetate. The reaction is carried out at temperatures preferably between 20° C. and 70° C. over a duration of preferably 1 to 3 hours. In a particularly preferred embodiment, the optionally trifluoromethanesulfonic acid-acidified, equilibrated, preferably end-equilibrated, α,ω-diacetoxypolydialkylsiloxane is further treated with base, especially with ammonia, before the reaction with polyether diol(s). After this post-treatment with base, preferably with ammonia, the α,ω-diacetoxypolydialkylsiloxanes by definition no longer contain any trifluoromethanesulfonic acid-derived acidity and only thereafter are they reacted with polyether diol(s) in the presence of a solid, liquid or gaseous base, optionally with the use of inert solvents, to afford the SiOC-linked, linear polydialkylsiloxane-polyoxyalkylene block copolymers having repeat (AB) units, i.e. component (e), with particular preference in the context of the present invention given to using as component (e) the exact same reaction products based on the use of equilibrated, preferably end-equilibrated, α,ω-diacetoxypolydialkylsiloxanes accordingly post-treated with base. Another factor that has generally proved to be of considerable importance in achieving a high-molecular-weight SiOC-linked A(BA)$_n$ polyether siloxane structure is the quality of the α,ω-diacetoxypolydialkylsiloxane used. Ensuring an ideal equilibration result in the α,ω-diacetoxypolydialkylsiloxane strongly favors the formation of a high-molecular-weight SiOC-linked A(BA)$_n$ polyether siloxane structure. The term "end-equilibrated" is accordingly to be understood as meaning that the equilibrium established at a temperature of 23° C. and a pressure of 1013.25 hPa has been reached. The point at which the above-mentioned equilibrium has been reached is indicated by the total cycles content determined by gas chromatography, defined as the sum of the D$_4$, D$_5$ and D$_6$ contents based on the siloxane matrix and determined after derivatization of the α,ω-diacetoxypolydialkylsiloxanes to the corresponding α,ω-diisopropoxypolydialkylsiloxanes. Derivatization to the α,ω-diisopropoxypolydialkylsiloxanes is intentionally opted for here in order to prevent a thermally induced retrocleavage reaction of the α,ω-diacetoxypolydialkylsiloxanes that could take place under the conditions of the gas chromatography analysis (for information on the retrocleavage reaction, see inter alia J. Pola et al., Collect. Czech. Chem. Commun. 1974, 39(5), 1169-1176 and also W. Simmler, Houben-Weyl, Methods of Organic Chemistry, vol. VI/2, 4$^{th}$ edition, 0-Metal Derivates of Organic Hydroxy Compounds p. 162 ff)). Accordingly, the total cycles content present therein, defined as the sum of the content fractions of the cyclic siloxanes comprising D$_4$, D$_5$ and D$_6$ based on the siloxane matrix, should preferably account for less than 13 percent by weight, more preferably less than 12 percent by weight, of the siloxane matrix consisting of α,ω-diisopropoxypolydialkylsiloxanes. Equilibrated α,ω-diacetoxypolydialkylsiloxanes of this quality, i.e. end-equilibrated α,ω-diacetoxypolydialkylsiloxanes, may be produced very advantageously, i.e. after just a very short reaction time, by reaction of siloxacycles (particularly comprising D$_4$ and/or D$_5$) with acetic anhydride in the presence of trifluoromethanesulfonic acid and acetic acid. It is preferable when acetic acid is added here in amounts of 0.4 to 3.5 percent by weight, preferably 0.5 to 3 percent by weight, more preferably 0.8 to 1.8 percent by weight, particularly preferably in amounts of 1.0 to 1.5 percent by weight, based on the reaction matrix consisting of acetic anhydride and cyclic siloxanes. The provision of accordingly usable, end-equilibrated α,ω-diacetoxypolydialkylsiloxanes is described by way of example in example 1 of the as yet unpublished European patent application under file reference 18189072.4. Since the degree of polymerization of the linear polydialkylsiloxane-polyoxyalkylene block copolymers is quality-determining, particularly for its surfactant activity in polyurethane ether foams, reaction monitoring plays an important role. A method that has proven useful for this purpose is the collection of samples of the reaction matrix over the course of the reaction and then analysing them, for example by $^{29}$Si-NMR and/or $^{13}$C-NMR spectroscopy. The integral of the signals characteristic of the presence of acetoxydimethylsiloxy groups —OSi(CH$_3$)$_2$OCOCH$_3$ decreases in tandem with the intended increase in the molar mass of the A(BA)$_n$ structured copolymer and is a reliable indicator of the reaction conversion achieved.

The previous section explained the provision of component (e), that is to say the SiOC-linked, linear polydialkylsiloxane-polyoxyalkylene block copolymers having repeat (AB) units, obtainable through the reaction of polyether diols with equilibrated, preferably end-equilibrated, α,ω-diacetoxypolydialkylsiloxanes. This reaction is effected as described by adding a solid, liquid or gaseous base, optionally with the use of inert solvents. This procedure allows the structures used as component (e) in the context of the present invention to be obtained.

The inert solvents used in the provision of component (e) are in a preferred embodiment alkanes, cycloalkanes, alkylaromatics, end-capped polyethers and/or emollient esters, such as esters derived from lauric acid, myristic acid, palmitic acid, stearic acid, oleic acid, isostearic acid, ricinoleic acid and behenic acid in combination with cetyl, stearyl, isostearyl, oleyl, octyldodecyl, myristyl and behenyl alcohol or glycerol, preferably myristyl myristate.

The siloxane blocks (A) of the block copolymers (i.e. component (e)) are in a preferred embodiment of the invention linear siloxane polymers or chains comprising repeat siloxane units that may be represented by the formula (—(R)$_2$SiO—)$_y$, where R=independently identical or different alkyl radicals having 1-16 carbon atoms or aryl radicals having 6-16 carbon atoms, preferably methyl, ethyl, phenyl, octyl, dodecyl or H, especially methyl.

The polyoxyalkylene block (B) of the linear block copolymers (i.e. component (e)) is in a preferred embodiment of the invention an oxyalkylene polymer containing repeat oxyalkylene units, here especially oxyethylene and propenyloxy units.

The weight-average molecular weight of each siloxane block (A) of the linear block copolymers (i.e. component (e)) is in a preferred embodiment between 650 to 6500 g/mol, preferably 700 to 2500 g/mol, more preferably 900 to 1500 g/mol.

The weight-average molecular weight of each siloxane block (A) is in a preferred embodiment between 650 to 6500 g/mol, preferably 700 to 2500 g/mol, more preferably 900 to 1500 g/mol.

The weight-average molecular weight of each polyoxyalkylene block of the copolymers thus produced is in a preferred embodiment between 600 and 10,000 g/mol, preferably 1000 to 5000 g/mol.

The size of the individual oxyalkylene units or siloxane blocks is not necessarily uniform, but may be freely varied within the specified limits.

The individual polyoxyalkylene units are in a preferred embodiment of the invention addition products of at least one oxyalkylene monomer selected from the group consisting of ethylene oxide, propylene oxide, butylene oxide, tetrahydrofuran, preferably mixed products composed of at least two monomer units, especially of ethylene oxide and propylene oxide.

The polyoxyalkylene blocks consist in a preferred embodiment essentially of oxyethylene units or oxypropylene units, preference being given to mixed oxyethylene and oxypropylene units having an oxyethylene proportion of 30 to 70 percent by weight and an oxypropylene proportion of 70 to 30 percent by weight, based on the total content of oxyalkylene units in the block.

In a preferred embodiment, the total proportion of the siloxane block (A) in the copolymer is between 15 and 50 percent by weight, preferably 20% to 40% by weight, and the proportion of the polyoxyalkylene blocks is between 80% and 50% by weight. The block copolymer has in a preferred embodiment an average weight-average molecular weight Mw of at least 10,000 g/mol to approx. 200,000 g/mol, preferably 25,000 g/mol to approx. 180,000 g/mol, especially 60,000 g/mol to approx. 120,000 g/mol.

The determination of the average molecular weights is based on the known methods of GPC analysis, with polystyrene used as standard.

The molar ratio of α,ω-diacetoxysiloxanes to polyether diols is in a preferred embodiment within a range from 0.90 to 1.10, preferably within a range from 0.95 to 1.05, more preferably within a range from 0.99 to 1.01. It is readily apparent to those skilled in the art that the achievable degree of polymerization is linked to achieving a virtually perfect stoichiometry of the reactants.

Component (e) is provided in a preferred embodiment through the reaction of equilibrated, preferably end-equilibrated, polyorganosiloxanes containing acetoxy-Si units, said polyorganosiloxanes having the general formula (III)

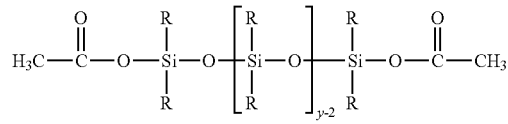

where:
R=independently identical or different alkyl radicals having 1-16 carbon atoms or aryl radicals having 6-16 carbon atoms, preferably methyl, ethyl, phenyl, octyl, dodecyl or H, especially methyl,
y=8 to 80, preferably 10 to 50, more preferably 10 to 25, with at least one alcohol selected from the group consisting of polyether diols of the general formula (IV)

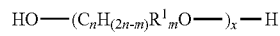

in which
R$^1$=identical or different alkyl radicals having 1 to 18 carbon atoms that optionally have ether functions, or aryl radicals having 6-18 carbon atoms that optionally have ether functions, preferably methyl, ethyl and benzyl, especially methyl,
n=2 to 4,
m=0 or 1,
x=represents a value of 1 to 200, preferably 10 to 100, especially 35 to 60, wherein the oxyalkylene segments —(C$_n$H$_{(2n-m)}$R$^1_m$O—) within an oxyalkylene ether radical may differ from one another, and the sequence of the individual segments —(C$_n$H$_{2n-m}$R$^1_m$O—) may be freely chosen and comprises especially block copolymers, random polymers and combinations thereof.

Preference is according to the invention given to polyether diols in which ethylene oxide (EO) and propylene oxide (PO) are present as copolymers. Particular preference is given to EO/PO copolymers having a block-type construction and having an EO content of approx. 30% to 70% by weight based on the total content of oxyalkylene units.

The production of these SiOC-linked, linear polydialkylsiloxane-polyoxyalkylene block copolymers (component (e)) may be carried out with or without use of a suitable solvent, but addition of a solid, liquid or gaseous base is necessary in all cases. If high-molecular-weight and consequently high-viscosity SiOC-linked copolymers are sought, for ease of handling during and after synthesis these may expediently be produced by reacting the respective polyether diol with the respective α,ω-acetoxysiloxane in a suitable solvent. Suitable solvents are alkanes, cycloalkanes, alkylaromatics, end-capped polyethers but also emollient esters such as myristyl myristate or the like, with particular preference given to high-boiling solvents having boiling points >120° C.

It has been found that swift and complete reaction of the equilibrated α,ω-diacetoxypolydialkylsiloxanes with polyether diols while avoiding discoloration of the reaction product is achieved in the presence of bases such as, in particular, ammonia. The use of ammonia corresponds to a particularly preferred embodiment.

In another preferred embodiment according to the invention, it may be the case that the polyetherol or polyetherol mixture provided for the coupling is initially charged with base(s), with stirring, prior to the addition of the equilibrated α,ω-diacetoxypolydialkylsiloxane. This reaction is preferably carried out at temperatures between 50° C. to 90° C. and preferably over a duration of 2 to 6 hours.

Examples of preferred simple bases that may be used are carbonates and/or hydrogen carbonates of alkali metals and/or alkaline earth metals and/or gaseous ammonia and/or amines. Given the known tendency to condensation of acetoxysiloxanes, very particular preference is given here to those bases that, on account of their chemical composition, do not introduce any water into the reaction system. Thus, anhydrous carbonates are preferred over hydrogen carbonates and bases free from water of hydration are preferred over bases containing water of hydration.

The reaction temperature at which the copolymers of the invention (corresponding to component (e)) are produced should in a preferred embodiment be 20° C. to 120° C., preferably 20° C. to 70° C.

The above considerations regarding component (e)) are likewise based on the as yet unpublished European patent application under file reference 18189072.4. In particular, reference is made in full to the examples disclosed therein.

The invention further provides a composition for use in the production of PU foams, preferably of flexible PU foam, HR PU foam, hypersoft PU foam or viscoelastic PU foam, especially viscoelastic PU foam, said composition comprising SiOC-linked, linear polydialkylsiloxane-polyoxyalkylene block copolymers having repeat (AB) units, produced by reacting polyether diols with equilibrated, preferably end-equilibrated, α,ω-diacetoxypolydialkylsiloxanes, in particular in accordance with the provisions as previously set out in the description. What was stated previously applies in particular to SiOC-linked, linear polydialkylsiloxane-polyoxyalkylene block copolymers having repeat (AB) units.

The siloxanes may in the context of the present invention also be used as a component of compositions having different carrier media. Examples of suitable carrier media are glycols, for example monoethylene glycol (MEG), diethylene glycol (DEG), propylene glycol (PG) or dipropylene glycol (DPG), alkoxylates or oils of synthetic and/or natural origin.

In a preferred embodiment of the invention, the above-mentioned composition for use in the production of PU foams includes carrier media, especially as specified above.

Preference is given to producing the PU foams by adding a sufficient amount of siloxane such that the proportion by mass of total siloxane based on the resulting polyurethane foam is from 0.0001% to 10% by weight, preferably 0.01% to 6% by weight, especially 0.05% to 5% by weight.

In a preferred embodiment, the PU foams according to the invention or produced according to the invention are open-cell PU foams, especially flexible PU foams, more preferably viscoelastic PU foam.

PU foams may in accordance with the invention be produced by any methods familiar to those skilled in the art, for example by manual mixing or preferably with the aid of high-pressure or low-pressure foaming machines. The process according to the invention may be executed continuously or batchwise. Batchwise execution of the process is preferable in the production of molded foams, refrigerators, footwear soles or panels. A continuous process is preferable for producing insulation panels, metal composite elements, slabs or in spraying methods.

A particularly preferred composition for production of polyurethane or polyisocyanurate foam for the purposes of the present invention has a density of preferably 5 to 800, especially 5 to 300, more preferably 5 to 150 and especially preferably of 10 to 90, kg/m$^3$, and has in particular the following composition:

Component Proportion by weight
Polyol 100
(Amine) catalyst 0.05 to 5
Potassium trimerization catalyst 0 to 10
Siloxane (total) 0.01 to 25, preferably 0.1 to 20
Water 0 to <25, preferably 0.1 to 15
Blowing agent 0 to 130
Flame retardant 0 to 70
Fillers 0 to 150
Further additives 0 to 20
Isocyanate index: greater than 15

In a preferred embodiment of the invention, it is a feature of the process that the PU foam is a rigid PU foam, a flexible PU foam, a viscoelastic PU foam, an HR PU foam, a hypersoft PU foam, a semirigid PU foam, a thermoformable PU foam or an integral PU foam, preferably a flexible PU foam, HR PU foam, hypersoft PU foam or viscoelastic PU foam, especially a viscoelastic PU foam.

In a preferred embodiment of the invention, the reaction to produce the PU foams is effected with use of
f) water, and/or
g) one or more organic solvents, and/or
h) one or more stabilizers against oxidative degradation, especially antioxidants, and/or
i) one or more flame retardants, and/or
j) further foam stabilizers other than component (e), based on siloxanes and/or polydialkylsiloxane-polyoxyalkylene copolymers, and/or
k) one or more further additives, preferably selected from the group consisting of surfactants, biocides, dyes, pigments, fillers, antistatic additives, crosslinkers, chain extenders, cell openers and/or fragrances.

The invention further provides a polyurethane foam, preferably rigid PU foam, flexible PU foam, viscoelastic PU foam, HR PU foam, hypersoft PU foam, semirigid PU foam, thermoformable PU foam or integral PU foam, preferably flexible PU foam, HR PU foam or viscoelastic PU foam, especially a viscoelastic PU foam, that is obtainable by a process as described above. The invention further provides a mattress and/or cushion comprising a polyurethane foam, especially viscoelastic flexible polyurethane foam, produced using SiOC-linked, linear polydialkylsiloxane-polyoxyalkylene block copolymers having repeat (AB) units, obtainable through the reaction of polyether diols with equilibrated, preferably end-equilibrated, α,ω- diacetoxypolydialkylsiloxanes, preferably obtained by a process and/or using a composition in each case elucidated in the preceding description, wherein, in the case of a viscoelastic flexible polyurethane foam, this preferably has a glass transition temperature between −20° C. and +15° C. and/or hardness CLD, 40% in accordance with DIN EN ISO 3386-1:2015-10, of 0.1-5.0 kPa, especially 0.5-3.0 kPa, and/or a rebound resilience of <10%, measured in accordance with DIN EN ISO 8307:2008-03, and/or a foam density of 30 to 130 kg/m$^3$ and/or a porosity (preferably after crushing the foam) of 1 to 250 mm, especially 1 to 50 mm, water column. What was stated previously applies in particular to SiOC-linked, linear polydialkylsiloxane-polyoxyalkylene block copolymers having repeat (AB) units.

The mattress and/or cushion according to the invention has in a preferred embodiment a height of at least 1 cm to not more than 50 cm and a width of at least 20 cm to not more than 300 cm, preferably of at least 70 cm to not more than 200 cm, and a length of at least 20 cm to not more than 300 cm, preferably of at least 150 cm to not more than 220 cm.

The invention further provides for the use of PU foams as described above as refrigerator insulation, insulation panel, sandwich element, pipe insulation, spray foam, 1- and 1.5-component can foam, imitation wood, modelling foam, floral foam, packaging foam, mattress, furniture cushion, moldable foam for furniture, pillows, rebonded foam, sponge foam, automobile seat cushion, headrest, dashboard, automobile interior trim, automobile roof liner, sound absorption material, steering wheel, footwear sole, carpet backing foam, filter foam, sealing foam, sealant and adhesive, or for production of corresponding products.

The invention further provides for the use of SiOC-linked, linear polydialkylsiloxane-polyoxyalkylene block copolymers having repeat (AB) units, obtainable through the reaction of polyether diols with equilibrated, preferably end-equilibrated, α,ω-diacetoxypolydialkylsiloxanes, for improving the emissions profile and odor neutrality of PU foams, preferably flexible PU foam, HR PU foam, hypersoft PU foam or viscoelastic PU foam, especially of viscoelastic PU foam.

The invention further provides for the use of SiOC-linked, linear polydialkylsiloxane-polyoxyalkylene block copolymers having repeat (AB) units, obtainable through the reaction of polyether diols with equilibrated, preferably end-equilibrated, α,ω-diacetoxypolydialkylsiloxanes, for reducing emissions of VOCs from PU foams, preferably flexible PU foam, HR PU foam, hypersoft PU foam or viscoelastic PU foam, especially viscoelastic PU foam.

For the above-mentioned uses too, what was stated previously applies in particular to SiOC-linked, linear polydialkylsiloxane-polyoxyalkylene block copolymers having repeat (AB) units.

The examples that follow describe the present invention by way of example, without any intention that the invention, the scope of application of which is apparent from the entirety of the description and the claims, be restricted to the embodiments specified in the examples.

Examples

Preparation of the Additives:

Example 1 (Inventive

In a 250 mL four-necked flask fitted with a precision glass stirrer, contact thermometer and water separator, 56.1 g (0.02 mol) of a polyether diol formed from ethylene oxide and propylene oxide units and having an average molar mass of approx. 2800 g/mol and a propylene oxide fraction of percent by mass is mixed with 91.3 g of toluene and dried azeotropically at 120° C. After cooling, 35.2 g (0.029 mol) of an α,ω-acetoxysiloxane having an average chain length of N=15 ($^{29}$Si-NMR analysis) is added and a moderate stream of dry ammonia is introduced for 3 hours with stirring. The resulting salts are then separated using a filter press. The clear filtrate obtained is concentrated to about 75% of its original volume on a rotary evaporator at a bottoms temperature of 150° C. and an applied vacuum of <1 mbar and then mixed with 91.3 g of a butanol-started polyetherol consisting solely of propyleneoxy units and having an average molar mass of 700 g/mol before continuing with the distillation under the previously chosen conditions until no more volatiles pass over. On cooling, a clear, colorless, highly viscous material is obtained.

Example 2 (Non-Inventive

The synthesis was carried out as described in EP1935922A2 example 1.

Production of the Polyurethane Foams:

The performance tests were carried out using two typical formulations for viscoelastic polyurethane foams having the following compositions:

TABLE 1

Formulation I for viscoelastic TDI80 flexible slabstock foam applications

| Formulation I | Parts by mass (pphp) |
|---|---|
| Voranol ® CP 755[1] | 70 |
| Voranol ® CP 3322[2] | 30 |
| Voranol ® CP 1421[3] | 15 |
| Desmodur ® T 80[4] Index <85> | 40.7 |
| Water | 1.95 |
| DABCO ® 33 LV[5] | 0.3 |
| DABCO ® BDE 11[5] | 0.2 |
| DABCO ® DMEA[5] | 0.2 |
| KOSMO ®® T 9[6] | 0.07 |
| Stabilizer | variable |
| Additive[8] | variable |

[1]Available from Dow Chemical; this is a glycerol-based polyether polyol having an OH value of 235 mg KOH/g.
[2]Available from Dow Chemical; this is a glycerol-based polyether polyol having an OH value of 48 mg KOH/g.
[3]Available from Dow Chemical; this is a polyether polyol having an OH value of 33 mg KOH/g.
[4]Tolylene diisocyanate T 80 (80% 2,4-isomer, 20% 2,6-isomer) from Bayer MaterialScience, 3 mPa · s, 48% NCO, functionality 2.
[5]Amine catalyst from Evonik Industries AG.
[6]Tin catalyst, available from Evonik Industries AG: tin(II) salt of 2-ethylhexanoic acid.
[8]The cell openers used are the inventive additive described in example 1, the non-inventive additive described in example 2 and, as a comparative cell opener, Niax ® L626 from Momentive Performance Materials.

TABLE 2

Formulation II, optimized for low-emissions, low-odor viscoelastic TDI80 flexible slabstock foam applications

| Formulation II | Parts by mass (pphp) |
|---|---|
| Voranol ® CP 755[1] | 70 |
| Voranol ® CP 3322[2] | 30 |
| Voranol ® CP 1421[3] | 15 |
| Desmodur ® T 80[4] Index <85> | 40.7 |
| Water | 1.95 |
| DABCO ® NE 750[5] | 0.33 |
| DABCO ® NE 300[5] | 0.22 |
| DABCO ® DMEA[5] | 0.2 |

TABLE 2-continued

Formulation II, optimized for low-emissions, low-odor viscoelastic TDI80 flexible slabstock foam applications

| Formulation II | Parts by mass (pphp) |
|---|---|
| KOSMOS ® EF[6)] | 0.19 |
| Stabilizer | variable |
| Additive[8)] | variable |

[1)]Available from Dow Chemical; this is a glycerol-based polyether polyol having an OH value of 235 mg KOH/g.
[2)]Available from Dow Chemical; this is a glycerol-based polyether polyol having an OH value of 48 mg KOH/g.
[3)]Available from Dow Chemical; this is a polyether polyol having an OH value of 33 mg KOH/g.
[4)]Tolylene diisocyanate T 80 (80% 2,4-isomer, 20% 2,6-isomer) from Bayer MaterialScience, 3 mPa · s, 48% NCO, functionality 2.
[5)]Amine catalyst from Evonik Industries AG.
[6)]Tin catalyst, available from Evonik Industries AG: tin(II) salt of 2-ethylhexanoic acid.
[8)]The cell openers used are the inventive additive described in example 1, the non-inventive additive described in example 2 and, as a comparative cell opener, Niax ® L626 from Momentive Performance Materials.

General Procedure for Production of the Foams:

The foams were produced at 22° C. and air pressure of 1013 mbar according to the details below. The polyurethane foams were in each case produced using 230 g of polyol, with appropriate adjustment of the other constituents of the formulation. This means, for example, that 1.0 part (1.0 pphp) of a component refers to 1 g of said substance per 100 g of polyol. A paper cup was charged with the tin catalyst used in the particular case, the three polyols, the water, the amine catalysts and the respective additive, and the contents were mixed with a disc stirrer at 1000 rpm for 60 s.

The isocyanate was then added and incorporated using the same stirrer at 1500 rpm for 7 s. In the course of this operation, the mixture in the cup began to foam. Immediately after the end of stirring, it was therefore poured into a foaming box. This has a base area of 17×17 cm and a height of 30 cm. A 5 cm layer of PU foam insulation on the outside prevents the contents from cooling too quickly. The box was lined on the inside with a plastic film that allows the cured foam to be subsequently removed. After the foam had been poured in, it rose up in the foaming box. In the ideal case, the foam blew off on reaching the maximum rise height and then receded slightly. This was accompanied by the cell membranes of the foam bubbles opening to afford a foam with an open-pore cell structure. If the stabilization effect was insufficient, the PU foam collapsed before reaching the maximum rise height. If stabilization was too pronounced, the foam continued to rise for a protracted period and did not blow off. In the latter case, the very closed cell structure meant that the foam shrank in the course of subsequent cooling as a result of the contraction in volume of the cooling gas.

Performance Tests:

The foams produced were assessed on the basis of the following physical properties:

a) Settling of the foam at the end of the rise phase (=fall-back):
   The settling, or the further rise, is calculated as the difference in the foam height immediately after blow-off and after 3 minutes after foam blow-off. The foam height is measured at the maximum in the middle of the foam crest by means of a needle secured to a centimetre scale. A negative value here describes a settling of the foam after blow-off; a positive value correspondingly describes a further rise of the foam.

b) Foam height:
   The foam height is the height after 3 minutes of the freely risen foam that is formed. The foam height is reported in centimetres (cm).

c) Rise time:
   The period of time between the end of mixing of the reaction components and the blow-off of the polyurethane foam.

D) Foam density:
   This is determined, as described in DIN EN ISO 845:2009-10, through measurement of the apparent density. Foam density is reported in kg/m$^3$.

e) Porosity:
   The air permeability of the foam was determined based on DIN EN ISO 4638:1993-07 by a dynamic pressure measurement on the foam. The measured dynamic pressure was reported in mm water column, lower dynamic pressure values being characteristic of a more open foam. The values were measured within a range from 0 to 300 mm. The dynamic pressure was measured using an apparatus consisting of a nitrogen source, reducing valve with pressure gauge, flow regulating screw, wash bottle, flow meter, T-piece, applicator nozzle and a graduated glass tube filled with water. The applicator nozzle has an edge length of 100×100 mm, a weight of 800 g, an internal diameter at the outlet opening of 5 mm, an internal diameter at the lower applicator ring of 20 mm and an external diameter at the lower applicator ring of 30 mm.

The measurement is carried out by setting the nitrogen inlet pressure to 1 bar by adjusting the reducing valve and setting the flow rate to 480 l/h. The amount of water in the graduated glass tube is set so that no pressure difference builds up and none can be read off. For the measurement on a test specimen having dimensions of 250×250×50 mm, the applicator nozzle is applied to the corners of the test specimen, flush with the edges, and also once to the (estimated) middle of the test specimen (in each case on the side having the greatest surface area). The result is read off when a constant dynamic pressure has been established.

The evaluation is based on the calculated average of the five measurements obtained.

f) Number of cells per cm (cell count):
   This is determined visually on a cut surface (measured in accordance with DIN EN 15702).

g) Hardness CLD 40% in accordance with DIN EN ISO 3386-1:1997+A1:2010.
   Measured values are reported in kilopascals (kPa).

h) Tensile strength and elongation at break in accordance with DIN EN ISO 1798:2008.
   Measured values for tensile strength are reported in kilopascals (kPa) and measured values for elongation at break in percent (%).

i) Rebound resilience in accordance with DIN EN ISO 8307:2007. Measured values are reported in percent (%).

Determination of Emissions at Room Temperature by the Test Chamber (TC) Test:

Emissions from the foams obtained from formulation II were determined at room temperature in accordance with DIN method DIN EN ISO 16000-9:2008-04. Sampling took place after 24 hours. For this, 2 litres of the test chamber atmosphere was passed at a flow rate of 100 mL/min through an adsorption tube packed with Tenax® TA (mesh 35/60). A description of the procedure for the thermal desorption with subsequent gas chromatography-mass spectrometry coupling (GC-MS) is given below.

a) Measurement technique:

Thermal desorption was carried out using a model TDS2 thermal desorber with autosampler from Gerstel, Mülheim connected to an Agilent 7890/5975 GC/MSD system.

b) The measurement conditions are indicated in Tables 3 and 4.

TABLE 3

Measurement parameters for thermal desorption in the test chamber measurement.

| Thermal desorption | Gerstel TDS2 |
|---|---|
| Desorption temperature | 280° C. |
| Desorption time | 5 min |
| Flow rate | 65 mL/min |
| Transfer line | 280° C. |
| Cryofocusing | KAS 4 |
| Liner | Glass evaporator tube containing silanized glass wool |
| Temperature | −150° C. |

TABLE 4

Measurement parameters for gas chromatography/mass spectrometry in the test chamber measurement.

| GC | Capillary-GC Agilent 7890 |
|---|---|
| Temperature program | −150° C.; 1 min; ↗ 10° C./sec; 280° C. |
| Column | Agilent 19091B-115, Ultra 2, 50 m * 0.32 mm FT 0.5 μm |
| Flow rate | 1.3 ml/min const. flow |
| Temperature program | 50° C.; 2 min; ↗ 3° C./min; 92° C.; ↗ 5° C./min; 160° C.; ↗ 10° C./min; 280° C., 20 min |
| Detector | Agilent MSD 5975 |
| Evaluation | Evaluation of the total ion current chromatogram by calculation as toluene equivalent |

Odor Testing of the Resulting Foams:

The finished foams, produced according to formulation IL, were packed in odor-neutral plastic bags and stored under airtight conditions. For the odor assessment of the foam, cubes measuring 10 cm×10 cm×10 cm were cut out and transferred to jars with a volume of 1 L, from which the samples were smelled. The jars were closed with a screw cap. The odor test took place after storing the jars for 24 hours at 22° C.

The odor test was assessed by a panel of 8 trained odor testers. They were questioned about the intensity of the odor, with minimal odor being rated 1, moderate odor 2, and strong odor 3. The eight independently obtained results were averaged to a mean value and rounded to whole numbers.

Results of the Foaming Operations:

The inventive additive from example 1, the non-inventive additive described in example 2 and, as a comparative cell opener, Niax® L 627 from Momentive Performance Materials are tested hereinbelow in formulations I and II.

The results of the performance tests for the various formulations and for the additives used are shown in Tables 5 and 6.

TABLE 5

Foaming results for the use of various cell openers according to formulation 1:

| No. | 1 | 2 | 3 | 4 | 5 |
|---|---|---|---|---|---|
| TEGOSTAB ® B 8002[a] | 1.5 | — | 1.5 | — | — |
| Additive | — | 0.5 pphp Niax ® L 626[b] | 0.7 pphp Example 1[c] | 2.5 pphp Example 2[d] | 3.5 pphp Example 2[d] |
| Rise time [s] | >300[e] | 140 | 135 | >300[e] | 165 |
| Rise height [cm] | — | 28.8 | 26.5 | — | 29.8 |
| Settling [cm] | — | 0.3 | 0.9 | — | 0.8 |
| Porosity [mm water column] | — | 12 | 28 | — | 260 |
| Density [kg/m³] | — | 50.7 | 55.0 | — | 51.2 |
| Hardness (CLD 40%) [kPa] | — | 1.2 | 1.3 | — | 1.3 |
| Cell count [cm⁻¹] | — | 6 | 8 | — | 11 |
| Tensile strength [kPa] | — | 31.7 | 41.1 | — | 49.7 |

[a] Polyether-modified polysiloxane, available from Evonik Industries AG.
[b] Comparative cell opener Niax ® L 626 from Momentive Performance Materials.
[c] Inventive additive, prepared according to Example 1.
[d] Noninventive additive, prepared according to Example 2.
[e] The foam rises up and does not blow off. Instead, the foam continues to rise for a prolonged period (>2.5 min). In the course of subsequent cooling, the foam shrinks considerably. Measurement of physical properties was not possible because of the shrinkage.

TABLE 6

Foaming results with use of various cell openers according to formulation II:

| No. | 6 | 7 | 8 | 9 |
|---|---|---|---|---|
| TEGOSTAB ® B 8002[a] | 1.5 | — | 2.0 | — |
| Additive | — | 0.5 pphp Niax® L 626[b] | 0.35 pphp Example 1[c] | 4.0 pphp Example 2[d] |
| Rise time [s] | >300[e] | 200 | 215 | 210 |
| Rise height [cm] | — | 28.6 | 30.2 | 29.0 |
| Settling [cm] | — | 0.8 | 1.1 | 1.0 |
| Porosity [mm water column] | | 75 | 15 | 140 |
| Density [kg/m³] | — | 50.0 | 47.6 | 49.8 |
| Hardness (CLD 40%) [kPa] | — | 0.5 | 0.7 | 0.8 |
| Cell count [cm⁻¹] | — | 10 | 5-6 | 11 |
| Tensile strength [kPa] | — | 23.8 | 29.2 | 34.4 |
| VOC [μg/m³] | — | 1632 | 229 | 4760 |
| Odor[f] | — | 2 | 1 | 3 |

[a] Polyether-modified polysiloxane, available from Evonik Industries AG.
[b] Comparative cell opener Niax® L 626 from Momentive Performance Materials.
[c] Inventive additive, prepared according to Example 1.
[d] Noninventive additive, prepared according to Example 2.
[e] The foam rises up and does not blow off. Instead, the foam continues to rise for a prolonged period (>2.5 min). In the course of subsequent cooling, the foam shrinks considerably. Measurement of physical properties was not possible because of the shrinkage.
[f] Odor testing was carried out as described above, by 8 trained persons and was based on the following gradings: 1 minimal odor, 2 moderate odor and 3 strong odor.

As shown in Table 5, when a cell-opening additive is not used with formulation I, a severely shrunken foam is obtained (entry 1). By using 0.5 pphp of the comparative cell opener Niax® L 626 (entry 2) or by using 0.7 pphp of the inventive additive described in Example 1 (entry 3), it is possible to obtain foams having a sufficiently open cell structure. On the other hand, the use of 2.5 pphp of the non-inventive additive described in Example 2 also results in severely shrunken foams (entry 4). Only by using 3.5 pphp, which is a very large amount for a cell opener, is it possible to obtain a sufficiently open cell structure that prevents shrinkage of the foam (entry 5). However, at 260 mm water column, the foam obtained is still classed as an almost-closed foam (foams are referred to as closed from about 300 mm water column). As shown in Table 6, when a cell-opener is not used with formulation II, a severely shrunken foam is again obtained (entry 6). As with formulation I, sufficiently open cell structures are again obtained when using the comparative cell opener Niax® L 626 with formulation II (0.5 pphp, entry 7). Even the use of 4.0 pphp of the non-inventive additive described in Example 2 (entry 9) results again in a stable foam. In the case of the inventive additive described in Example 1 (entry 8), the use of just 0.35 pphp is sufficient to produce a stable, open foam. Formulation II describes an emissions-optimized formulation for viscoelastic polyurethane foam. Both the emissions load and the intensity of the odor of the foams were determined using this formulation. The foam characterized by the use of 0.5 pphp of Niax® L 626 (entry 7) has a very high emissions value (1632 µg/m$^3$) and a strong odor. The foam produced using 4.0 pphp of the non-inventive additive has both an extremely high emissions value (4760 µg/m$^3$) and a very strong odor (entry 9). On the other hand, the foam produced using the inventive additive has very low emissions values (229 µg/m$^3$) and was classified as odor-neutral by the majority of testers (entry 8). The odor test was repeated two more times by the testers, with the above-mentioned results confirmed in identical manner. It is clear from the results that foams treated with an inventive additive were rated by testers as being less intensely odorous.

The invention claimed is:

1. A process for producing a polyurethane foam, the process comprising: reacting
   (a) at least one polyol component with
   (b) at least one isocyanate component in the presence of
   (c) one or more catalysts that catalyse an isocyanate-polyol and/or isocyanate-water and/or isocyanate trimerization reactions, and
   (d) optionally one or more chemical or physical blowing agents, with
   (e) SiOC-linked, linear polydialkylsiloxane-polyoxyalkylene block copolymers having repeat (AB) units, wherein A is a polydialkylsiloxane block and B is a polyoxyalkylene block,
   obtained through a reaction of polyether diols with equilibrated α,ω-diacetoxypolydialkylsiloxanes,
   wherein a sufficient amount of the SiOC-linked, linear polydialkylsiloxane-polyoxyalkylene block copolymers having repeat (AB) units is added such that the proportion by mass of said component (e), based on the finished polyurethane foam is from 0.0001% to 10% by weight.

2. The process according to claim 1, wherein the polyurethane foam is a rigid polyurethane foam, a flexible polyurethane foam, a viscoelastic polyurethane foam, an HR polyurethane foam, a hypersoft polyurethane foam, a semi-rigid polyurethane foam, a thermoformable polyurethane foam or an integral polyurethane foam.

3. The process according to claim 1, wherein the reaction is effected with
   f) water, and/or
   g) one or more organic solvents, and/or
   h) one or more stabilizers against oxidative degradation, and/or
   i) one or more flame retardants, and/or
   j) foam stabilizers other than component (e), and/or
   k) one or more further additives.

4. The process according to claim 1, wherein a weight-average molecular weight of each polydialkylsiloxane block (A), which has the formula (—(R)$_2$SiO—)$_y$, wherein y is 8 to 80, of the SiOC-linked, linear polydialkylsiloxane-polyoxyalkylene block copolymers having repeat (AB) units, is between 600 to 6100 g/mol, and
   wherein R=independently identical or different alkyl radicals having 1-16 carbon atoms or aryl radicals having 6-16 carbon atoms.

5. The process according to claim 1, wherein the polyoxyalkylene block (B) has the formula (C$_n$H$_{(2n-m)}$R$^1_m$O—)$_x$, wherein x is 10 to 200, n is 2 to 4, and m is 0 or 1, of the SiOC-linked, linear polydialkylsiloxane-polyoxyalkylene block copolymers comprises mixed oxyethylene and oxypropylene units having an oxyethylene proportion of from 30 to 70 percent by weight and an oxypropylene proportion of from 70 to 30 percent by weight, based on the total content of oxyalkylene units in the block, and
   wherein R$^1$=identical or different alkyl radicals having 1 to 18 carbon atoms that optionally have ether functions, or aryl radicals having from 6-18 carbon atoms that optionally have ether functions.

6. The process according to claim 1, wherein the weight-average molecular weight of each polyoxyalkylene block (B), which has the formula (C$_n$H$_{(2n-m)}$R$^1_m$O—)$_x$, wherein x is 10 to 200, n is 2 to 4, and m is 0 or 1, of the SiOC-linked, linear polydialkylsiloxane-polyoxyalkylene block copolymers, is between 600 and 10,000 g/mol, and
   wherein R$^1$=identical or different alkyl radicals having from 1 to 18 carbon atoms that optionally have ether functions, or aryl radicals having 6-18 carbon atoms that optionally have ether functions.

7. The process according to claim 1, wherein the proportion of the polydialkylsiloxane blocks (A) in the total SiOC-linked, linear polydialkylsiloxane-polyoxyalkylene block copolymer is between 15 and 50 percent by weight.

8. The process according to claim 1, wherein the SiOC-linked, linear polydialkylsiloxane-polyoxyalkylene block copolymer has a weight-average molecular weight of from 10,000 g/mol to 200,000 g/mol.

9. A composition for use in the production of polyurethane foams, which comprises a SiOC-linked, linear polydialkylsiloxane-polyoxyalkylene block obtained A copolymer having repeat (AB) units, obtained through the reaction of polyether diols with equilibrated α,ω-diacetoxypolydialkylsiloxanes, produced by a process according to claim 4,
   and further comprises monoethylene glycol (MEG), diethylene glycol (DEG), propylene glycol (PG) or dipropylene glycol (DPG), alkoxylates or oils of synthetic and/or natural origin.

10. A polyurethane foam, wherein it is obtained by a process according to claim 1.

11. A product, comprising:
    the polyurethane foam according to claim 10, wherein the product is at least one selected from the group consisting of refrigerator insulation, insulation panel, sandwich element, pipe insulation, spray foam, 1- and 1.5-component can foam, imitation wood, modelling foam, packaging foam, mattress, furniture cushion, automobile seat cushion, headrest, dashboard, automobile interior trim, automobile roof liner, sound absorption material, steering wheel, footwear sole, carpet backing foam, filter foam, sealing foam, sealant and adhesive, coating, and corresponding products.

12. A polyurethane foam comprising a SiOC-linked, linear polydialkylsiloxane-polyoxyalkylene block copolymers having repeat (AB) units, obtained through the reaction of polyether diols with equilibrated α,ω-diacetoxypolydialkylsiloxanes, for improving the emissions profile and odor neutrality of the polyurethane foam.

13. A mattress and/or cushion, comprising:
a viscoelastic polyurethane foam, produced using SiOC-linked, linear polydialkylsiloxane-polyoxyalkylene block copolymers having repeat (AB) units, obtained through the reaction of polyether diols with equilibrated α,ω-diacetoxypolydialkylsiloxanes, obtained by a process,
comprising: reacting
(a) at least one polyol component with
(b) at least one isocyanate component in the presence of
(c) one or more catalysts that catalyse the isocyanate-polyol and/or isocyanate-water and/or isocyanate trimerization reactions, and
(d) optionally one or more chemical or physical blowing agents, with
(e) SiOC-linked, linear polydialkylsiloxane-polyoxyalkylene block copolymers having repeat (AB) units, wherein A is a polydialkylsiloxane block and B is a polyoxyalkylene block,
obtained through a reaction of polyether diols with equilibrated α,ω-diacetoxypolydialkylsiloxanes,
wherein a sufficient amount of the SiOC-linked, linear polydialkylsiloxane-polyoxyalkylene block copolymers having repeat (AB) units is added such that the proportion by mass of said component (e), based on the finished polyurethane foam is from 0.0001% to 10% by weight,
wherein the viscoelastic PU foam has: a glass transition temperature between −20° C. and +15° C. and/or hardness CLD, 40% in accordance with DIN EN ISO 3386-1:2015-10, of 0.1-5.0 kPa, and/or a rebound resilience of <10%, measured in accordance with DIN EN ISO 8307:2008-03, and/or a foam density of from 30 to 130 kg/m$^3$, and/or a porosity after crushing the foam of from 1 to 250 mm water column.

14. The mattress and/or cushion according to claim 13, which has a height of at least 1 cm to not more than 50 cm and a width of at least 20 cm to not more than 300 cm.

15. The process according to claim 1, wherein the polyoxyalkylene block (B) has the formula $(C_nH_{(2n-m)}R^1_mO-)_x$, wherein n is 2 to 4 and m is 0 or 1, and x is 10 to 200, and comprises mixed oxyethylene and oxypropylene units having an oxyethylene proportion of from 30 to 70 percent by weight and an oxypropylene proportion of from 70 to 30 percent by weight, based on the total content of oxyalkylene units in the block, and
wherein $R^1$ is at least one selected from the group consisting of methyl, ethyl, and benzyl.

16. The process according to claim 1, wherein a weight-average molecular weight of each polyoxyalkylene block (B), which has the formula $(C_nH_{(2n-m)}R^1_mO-)_x$ is between 600 and 10,000 g/mol, wherein n is 2 to 4 and m is 0 or 1 and x is 10 to 200, and
wherein $R^1$ is at least one selected from the group consisting of methyl, ethyl, and benzyl.

17. The process according to claim 1, wherein the proportion of the polydialkylsiloxane blocks A in the total SiOC-linked, linear polydialkylsiloxane-polyoxyalkylene block copolymer is between 20 and 40 percent by weight.

18. The process according to claim 1, wherein the SiOC-linked, linear polydialkylsiloxane-polyoxyalkylene block copolymer has a weight-average molecular weight of from 25,000 g/mol to 180,000 g/mol.

19. The process according to claim 1, wherein the SiOC-linked, linear polydialkylsiloxane-polyoxyalkylene block copolymer has a weight-average molecular weight of from 60,000 g/mol to 120,000 g/mol.

20. The process according to claim 1, wherein the equilibrated α,ω-diacetoxypolydialkylsiloxanes are end equilibrated.

* * * * *